United States Patent [19]

Robinson

[11] 3,781,799

[45] Dec. 25, 1973

[54] CONTROL SYSTEM EMPLOYING MICROPROGRAM DISCRETE LOGIC CONTROL ROUTINES

[75] Inventor: Thomas Scott Robinson, Rochester, Minn.

[73] Assignee: International Business Machines Corporation, Armonk, N.Y.

[22] Filed: Jan. 3, 1972

[21] Appl. No.: 215,046

[52] U.S. Cl. .................... 340/146.3 MA, 340/172.5

[51] Int. Cl. .................................... G06k 9/00

[58] Field of Search ..................... 340/146.3, 172.5

[56] References Cited

UNITED STATES PATENTS

| | | | |
|---|---|---|---|
| 3,321,609 | 5/1967 | Bonney et al. | 235/154 X |
| 3,573,730 | 4/1971 | Andrews et al. | 340/146.3 MA |
| 3,587,047 | 6/1971 | Cutaia | 340/146.3 H |
| 3,629,827 | 12/1971 | Johnston et al. | 340/146.3 H |
| 3,462,737 | 8/1969 | Malaby | 340/146.3 H |
| 3,618,018 | 11/1971 | Johnston et al. | 340/146.3 AH |

*Primary Examiner*—Maynard R. Wilbur
*Assistant Examiner*—Leo H. Boudreau
*Attorney*—K. O. Hesse et al.

[57] ABSTRACT

An improved control system including discrete logic control routines for high speed simultaneous control of many sequencing gates. The discrete logic control routines are sequentially selected by micro-orders from microporgrams. Each microprogram contains a sequence of microinstructions to select discrete logic control routines in a most efficient sequence in order to perform a different operation such as reading an A font character or reading a hand printer character. The selection between different microprograms is accomplished by macroinstructions from a controlling computer.

9 Claims, 12 Drawing Figures

CONTROL SYSTEM EMPLOYING MICROPROGRAM DISCRETE LOGIC CONTROL ROUTINES

FIELD OF THE INVENTION

This invention relates to electrical communications in general, and is more specifically to character recognition control systems for use in electric communications.

DESCRIPTION OF THE PRIOR ART

Prior art control systems for optical character recognition scanners have been special purpose machines which are designed for each special job to be performed. These machines usually require an extensive adjustment procedure prior to operation and usually lack diagnostic capability because of the extensive use of adjustable shot timers and analog discriminators for determining timing intervals and for position marking.

A few program controlled experimental systems have been built and used to study the problems of character recognition. These machines offer considerable flexibility for performing research experiments but were not intended to be a prototype of commercial recognition machines because of their slow speed of operation and high cost. These prior art machines require a programming instruction for each individual scan as well as long instruction word lengths in order to control the large numbers of sequencing gates required for complex operations.

SUMMARY OF THE INVENTION

It is an object of this invention to control apparatus having a high operating speed and a large number of controllable functions by using an improved combination of macroprogramming, microprogramming, and discrete logic to achieve high speed simultaneous control of many sequencing gates without requiring an excessively high speed memory or excessively long microinstruction length.

It is a further object of this invention to control the scan pattern of a scanner using an improved combination of macroprogramming, microprogramming, and discrete logic to achieve increased operating speed while retaining the flexibility and diagnostic capabilities of line-by-line programmed scan control.

It is a further object of this invention to process data received from a scanner using an improved combination of macroprogramming, microprogramming, and discrete logic including center directed shift registers to more efficiently normalize the height and width of a subsequent recognition raster scan.

It is a still further object of this invention to more efficiently control a scanner so that any of a variety of document information fields which differ in size and format can be selectively scanned by selecting a microprogram having a most suitable sequence of discrete logic control routines and associated operating parameters by way of a macroprogrammed instruction.

It is still a further object of this invention to control a scanner by way of a microprogram instruction having a control field containing control routine selection information and a modifier field containing operating parameter selection information.

These and other objects which will become apparent while reading the specification are accomplished by utilizing a microinstruction to initiate a discrete logic control routine when then sequences through required control functions as modified by micro-orders contained within the microinstruction. Different microprograms are selected by macroinstructions having different OP codes such as read A font or read hand print.

A PREFERRED EMBODIMENT OF THE INVENTION

Figure 10:
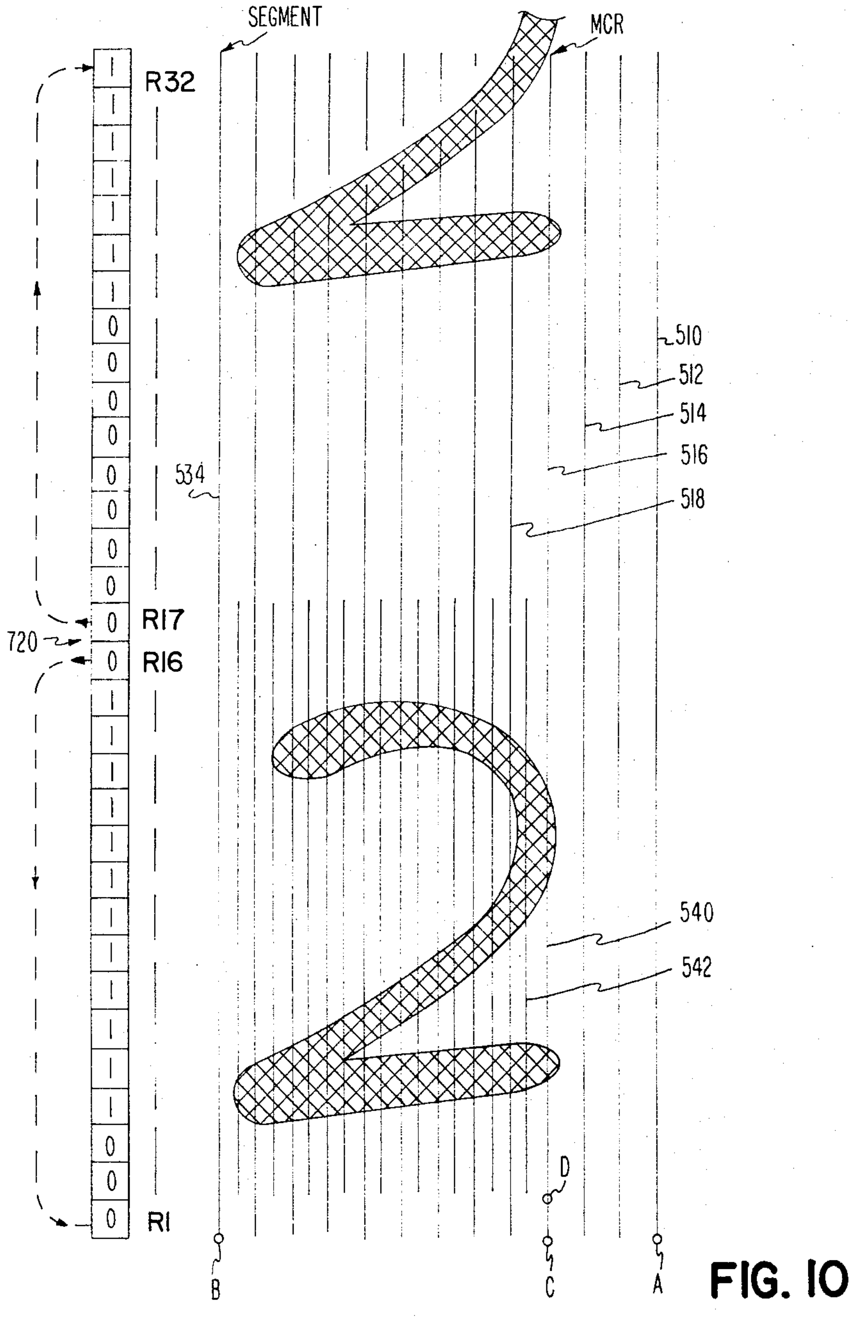

FIG. 10 shows how the scanner is controlled to read a character.

Figure 1:
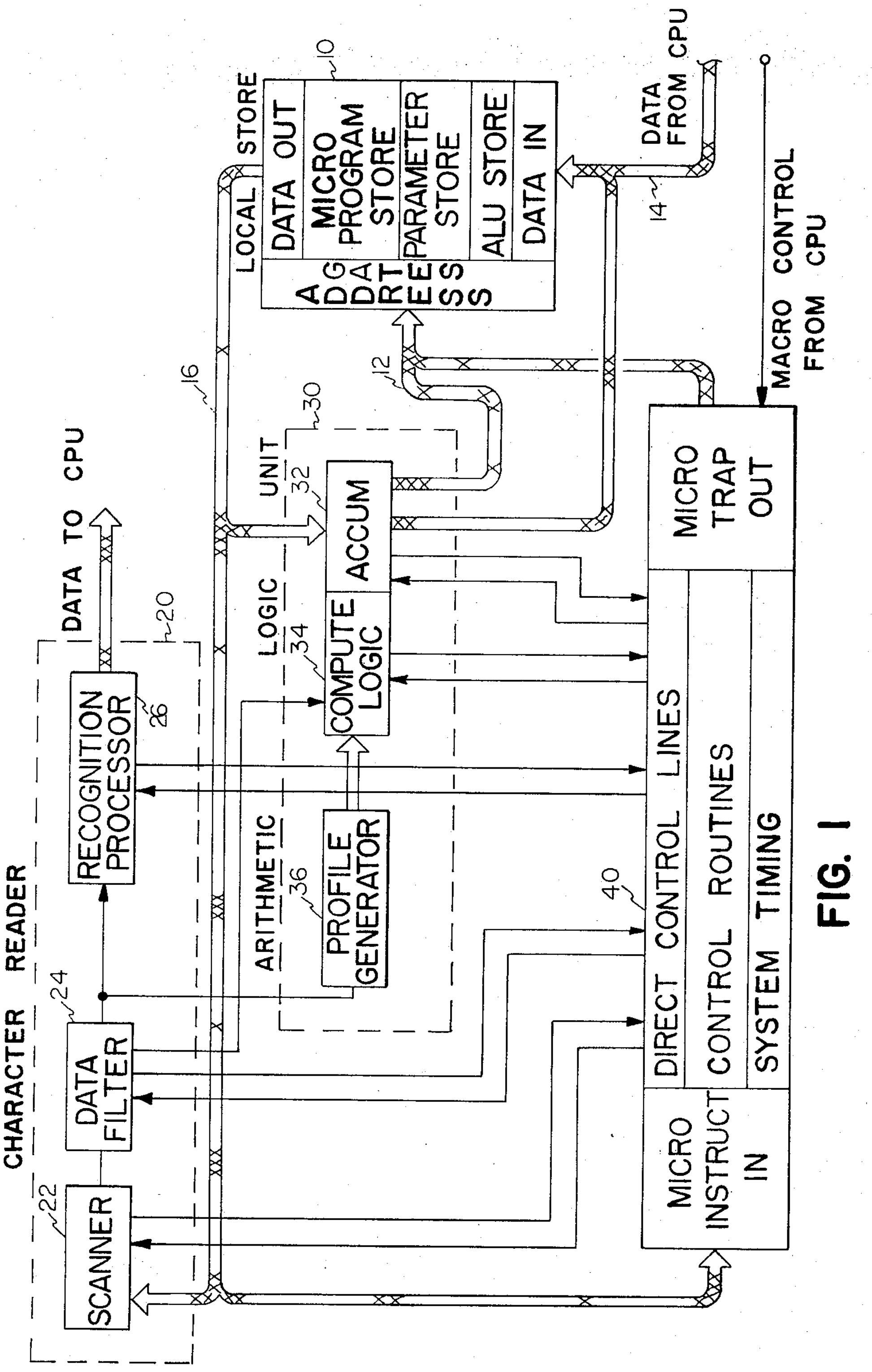
FIG. 1 shows the overall system diagram of a preferred embodiment.

A general description of a preferred embodiment of the invention will now be set forth with reference to the control system block diagram shown in FIG. 1. In order to store microprogram instructions, normalization translate tables, and arithmetic logic unit intermediate results, a local store 10 is provided. Local store 10 may be any of a number of well known read write memories having an address bus 12 for receiving digital words specifying storage locatings, a data in bus 14 for receiving digital words representing instructions, translate table entries, or intermediate results, and a data out bus 16 for transmitting digital words from the local storage 10.

An arithmetic logic unit 30 receives digital information from local store out bus 16, performs arithmetic operations upon digital information, and has an output connected to local store data in bus 14 as well as local store address bus 12. Whenever the output of arithmetic logic unit 30 is gated to local store data in bus 14, intermediate computational results can be temporarily stored in local store 10. Whenever the output of arithmetic logic unit 13 is connected to the address bus 12, translation tables stored within local store 10 can be addressed. This capability is utilized when normalizing the size of a raster scan pattern to be compatible with the aspect ratio (ratio of character size to raster size) required by the character recognition processor 26 of character reader 20. Arithmetic logic unit 30 includes an accumulator 32 for performing addition and subtraction as well as counting operations. Arithmetic logic unit 12 also includes a compute logic section 34 which is shown in detail in FIG. 8. Compute logic section 34 contains discrete logic decision tree networks for most efficiently converting prescan information into addresses which can be translated into horizontal and vertical normalization values for correction scan rates and into scan starting position correction values.

Arithmetic logic unit 30 has a profile generator 36 for accumulating a vertical profile of a character contained within an area being scanned during a prescan routine. Profile generator 36 will be described in more detail later with respect to FIG. 7.

Profile generator 36 receives video data from data filter 24 and develops a profile of any character or characters within the area being prescanned by scanner 22. Profile generator 36 has direct control lines to and from scanning sequence control 40 in order to allow control routines therein to develop the character profile and to gate this profile to compute logic 34 at the proper times.

The output bus 16 of local store 10 is also connected to a scanner 22 of character reader 20 in order to transmit translated horizontal and vertical scan rate normalization and scan starting position information from local store to scanner 22. This information controls the size and position of the recognition raster to provide video data output to recognition processor 26 having the proper aspect ratio. Scanner 22 is shown in more detail in FIG. 9. A data filter 24 is connected to the video output of scanner 22. Data filter 24 includes a digital filtering circuit operating in accordance with any of a number of well known filtering algorithms to remove extraneous dark bits and fill in extraneous light bits in the video data stream. Data filter 24 also includes a minimum character requirement detection circuit for detecting when that minimum number of dark bits has been received which would indicate that a character is present within the area being scanned by scanner 22. Data filter 24 also includes a segment detect circuit operating in accordance with any of a number of well known algorithms for detecting the end of a character. Direct control lines are connected from data filter 24 to sequence control 40 and compute logic 24 in order to transmit MCR (Minimum Character Requirement) and segment detected signals to control routines and the compute logic 34. Data filter 24 has a data output which is connected to an output of recognition processor 26 as well as an input of profile generator 36. Recognition processor 26 has direct control lines to and from sequence control 40 and operates under control of these direct control lines to apply well known recognition algorithms to video data input for recognizing characters represented by video data input. Recognition processor 26 has a data output which is connected through an I/O channel to the controlling computer.

The output bus 16 of local store 10 is further connected to sequence control 40. Sequence control 40 includes a plurality of discrete logic control routine circuits such as prescan, compute normalization and vertical centering, move horizontal and move vertical. Other routine logic circuits which are not shown in detail could also be included in sequence control 40. Examples are return to bench mark, scan for recognition, as well as a character idle routine which would allow the control unit to go into a wait state for short periods of time to allow completion of recognition processing of previous characters. These routines are known in the prior art and used in machines such as the IBM 1288 and 1975 optical page readers. For brevity, both the functions performed by these circuits and the circuits themselves will be referred to as "discrete logic control routines." By following the teachings of this invention as applied to the routines herein disclosed, these and other routines could be implemented into a control system of this invention by those skilled in the art of logic circuit design. Each of the routines contained within sequence control 40 is energized by a microinstruction received from one of many possible microprograms stored in local store 10. Each microprogram stored in local store 10 contains the most efficient sequence of control routines that will be required to scan a different type of character such as hand print, preprinted, typewritten, and so forth. For example, hand print being of varying size characters will require a compute routine for every character whereas typed characters will only require that normalization and vertical centering be computed for the first character of a line. Each microinstruction initiates one or more control routines and provides one or more modification micro-orders. The control routines of sequence control 40 are discrete logic because this allows larger numbers of control functions to be simultaneously performed by sequencing gates in quick succession without requiring excessive microprogram instruction length or excessive execution time. Each control routine or sequence control 40 has a plurality of direct input and output control lines to the other operating units of the control system. A trap control routine of sequence control 40 is connected to all other control routines and to the address bus 12 of local store 10 as well as a macro control input bus from the controlling computer. The trap control routine controls execution of that microprogram which has been placed in control by the trap control routine in accordance with an OP code it received as part of a macroinstruction from the controlling computer.

Sequence control 40 further includes system timing circuits to synchronize operation of the system. Inasmuch as system timing is well known, it is not shown in FIG. 1 and will only be briefly described here. The system timing includes a main oscillator having a plurality of binary frequency dividing flips flops connected in series to its output. Decoding circuits are connected to the frequency dividing flip flops to generate four nonoverlapping sequential clock output signals designated clock 0 through clock 3. The output of clock 3 drives a vertical scan ring counter having 40 stages. The output of each of the stages one through 40 provides an output VSR 1 through VSR 40 respectively in sequence. The system timing circuits are continuously running whenever the control system is turned on.

Figure 2:
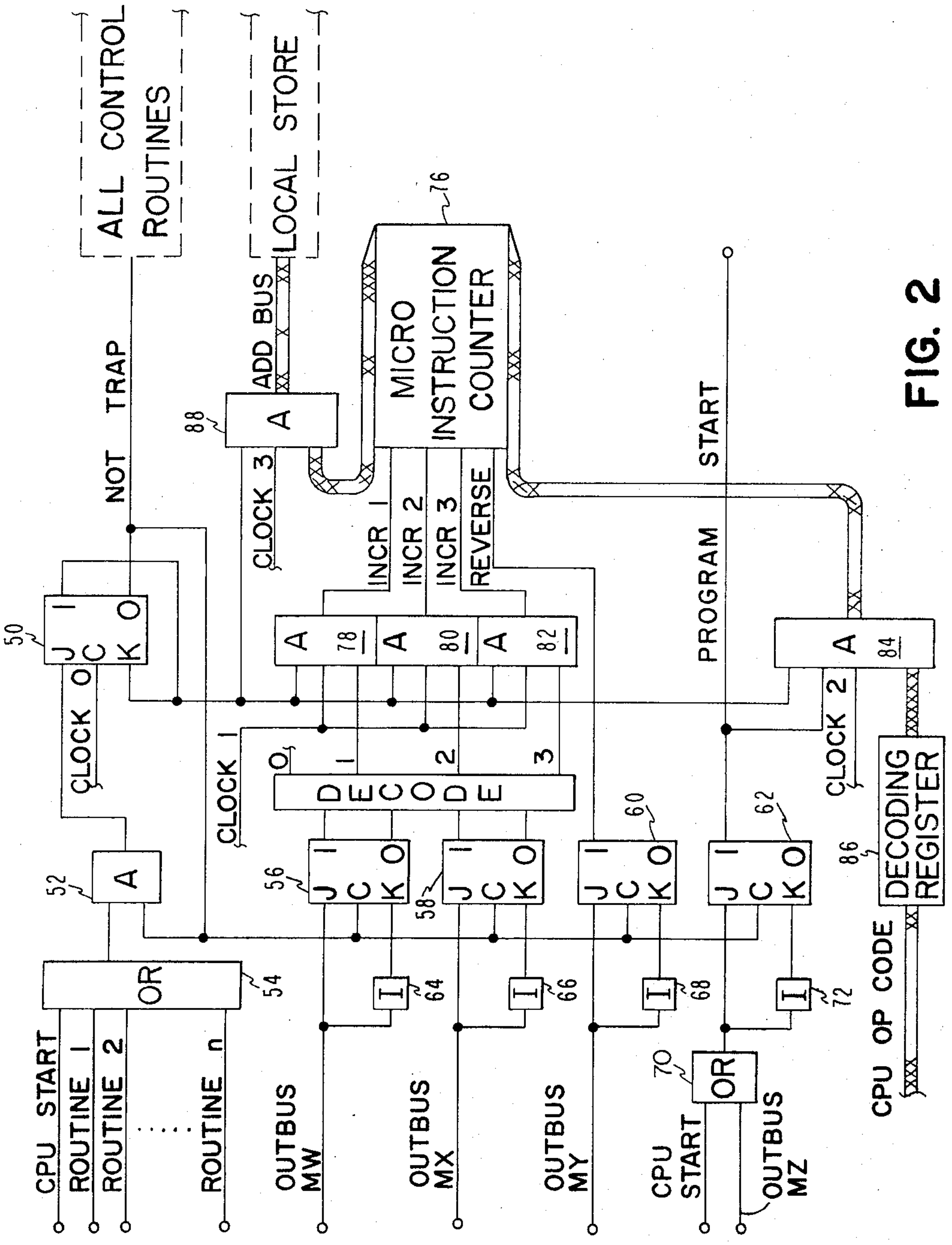
FIG. 2 shows a discrete logic trap control routine which passes control back and forth between discrete logic routines and a microprogram.

The trap control routine shown in FIG. 2 and contained within sequence control 40 will now be described in more detail. The trap control routine is initiated by a CPU start macro control instruction directly from the controlling computer, as well as routine end signals received from all other control routines as each control routine terminates. The trap control routine selects one of the plurality of microprograms stored in local store 10 in accordance with the OP code received from the computer and executes the selected microprogram by retrieving microinstructions from the selected microprogram, initiating those control routines called for by each microinstruction, and then retrieving the next microinstruction called for by the condition of modifier bits contained with the previous microinstruction. Referring again to FIG. 2, a trap flip flop 50 is provided having a J input connected to the output of AND gate 52. Trap flip flop 50 can be any AC set type flip flop such as a bistable multivibrator having harper gates. AND gate 52 has a first input connected to the OFF output of flip flop 50 and another input connected to the OR gate 54. OR gate 54 has a first input for receiving a start signal from the controlling computer and a plurality of further inputs, each connected to a different control routine for receiving a routine end signal therefrom. Whenever a CPU start signal or a routine end signal is received, trap flip flop 50 is set by timing signal clock zero which is connected to the C input of flip flop 50. The K input of flip flop 50 is connected to the ON output of flip flop 50 to gate flip flop 50 off at the next clock zero timing signal. The OFF output of flip flop 50 labeled "not trap" is connected to the C input of each control and modifier flip flop of each control routine including flip flops 56, 60 and 62 of the trap control routine.

Flip flops 56 through 62 act in conjunction with flip flop 50 to select the next microinstruction as designated by modifier bits received on out bus 16 lines MW, MX, MY, and MZ from the previous microinstruction. Out bus 16 line MW is connected to the J input of flip flop 56 and to the input of inverter 64 which, in turn, acts as an output connected to the K input of flip flop 56. Out bus line MX is connected to the J input of flip flop 58 and to the input of inverter 66 which, in turn, has an output connected to the K input of flip flop 58. Microinstruction modifier bits MW and MX designate the distance of the next microinstruction from the present microinstruction. The ON and OFF outputs of flip flops 56 and 58 are connected to decode 74 which generates increment signals to increment the microinstruction counter 76 to generate the next microinstruction address. The 1, 2, and 3 increment outputs of decode 74 are connected to first inputs of AND gates 78, 80, and 82 is connected to clock 1 timing signal. A third input of each of AND gates 78, 80, and 82 is connected to the ON output of trap flip flop 50. The output of each of AND gates 78, 80, and 82 is connected to the 1, 2, and 3 increment input of microinstruction counter 76. Out bus 16 line MY is connected to the J input of flip flop 60 and to the input of inverter 68 which, in turn, has an output connected to the K input of flip flop 60. The ON output of flip flop 60 is connected to the increment reverse input of microinstruction counter 76. Out bus 16 line MZ is connected to a first output of OR gate 70 which has a second input receiving a CPU start signal from the controlling computer. The output of OR gate 70 is connected to the J input of flip flop 62 and to the input of inverter 72 which, in turn, has an output connected to th K input of flip flop 62. The ON output of flip flop 62 is labeled PROGRAM START and is connected back to the controlling computer to signal that execution of a microprogram has been started. The ON output of flip flop 62 is also connected to a first input of each of a plurality of AND gates 84, each of AND gates 84 has a second input connected to the output of trap flip flop 50 and a third input connected to system timing signal clock 2. Each of AND gates 84 has a fourth input connected to a different output of OP code decoding register 86. Decoding register 86 has a plurality of inputs for receiving an OP code from the controlling computer. The OP codes from the controlling computer, when decoded, specify the starting address of a microprogram stored in local store 10. The outputs of AND gates 84 are each connected to the set input of a different stage of microinstruction counter 76 in order to load microinstruction counter 76 with the decoded OP code which represents the address of the microprogram to be used for reading a character. Each stage of microinstruction counter 76 has an output which is connected to a first input of a different one of the plurality of AND gates 88. Each of AND gates 88 also has a second input connected to the ON output of trap flip flop 50 and a third input connected to clock 3 timing signal. The output of each of AND gates 88 connected to a different line of address bus 14, thereby gating the address of the next microinstruction to local store 10. Local store 10 responds to the address provided by AND gates 88 by placing the microinstruction stored at the selected address on out bus 16. Micro-order bits of the microinstruction on out bus 16 will be stored in control and modifier micro-order flip flops when trap flip flop 50 is reset at clock zero.

Figure 3:
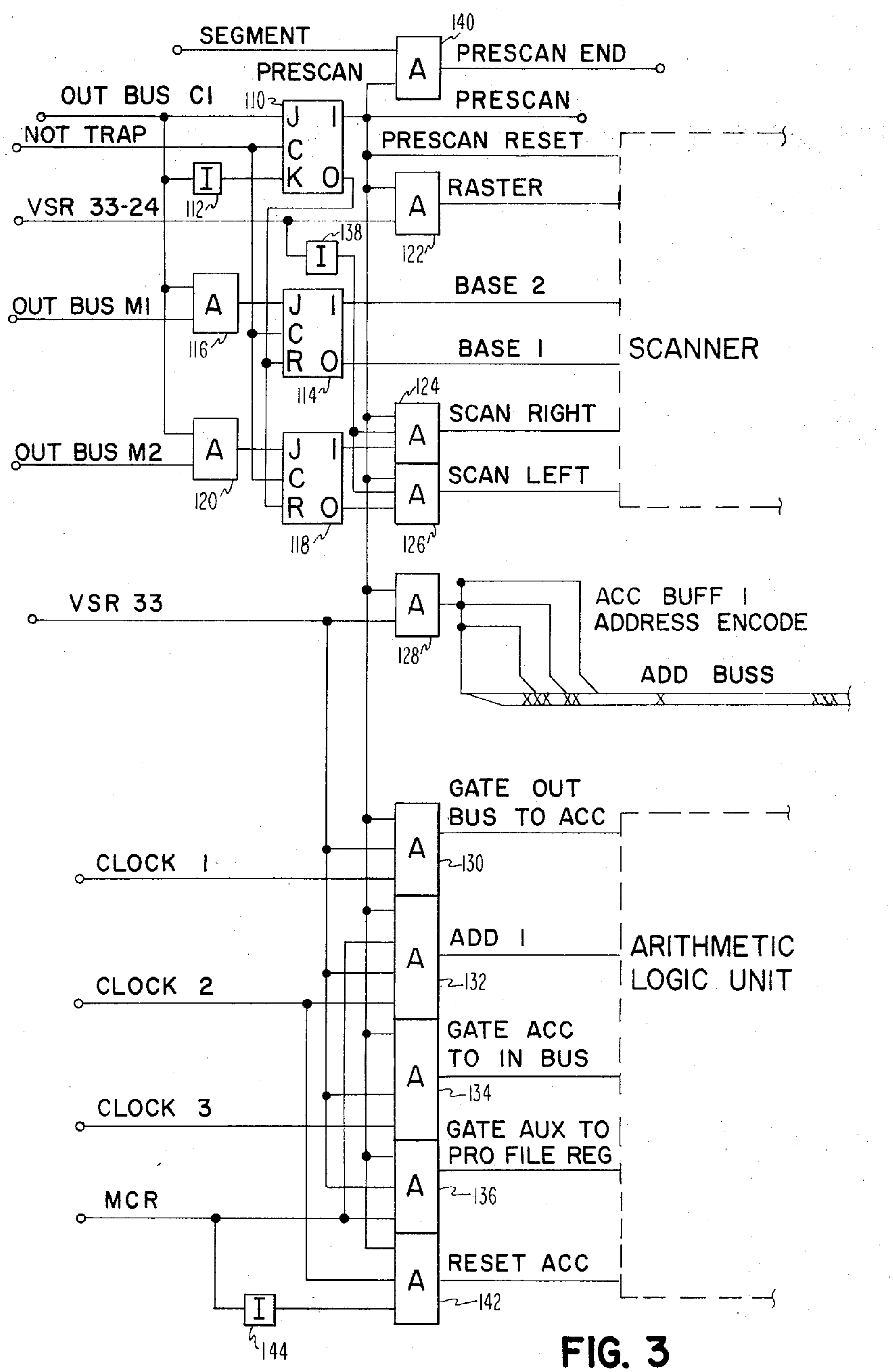
FIG. 3 shows a discrete logic prescan routine having utility in controlling a character reader.

Referring now to FIG. 3, the prescan control routine contained with sequence control 40 will be described in detail. A prescan micro-order JK flip flop 110 is provided. Prescan flip flop 110 has a J set gate input connected to the C1 line of output bus 16. This allows the first bit in the control field of each microinstruction to directly control prescan flip flop 110 without an intermediate decoding circuit. It is well recognized that the use of instruction decoding circuitry allows a smaller microprogram instruction to control a larger number of functions and therefore such an implementation would be well within the spirit and scope of this invention. With this in mind, the direct one for one relationship between microprogram control bit and modifier bits to related control functions and modifying parameter selection will be utilized purely for reasons of simplifying this description. The C1 line of the output bus is also connected to inverter 112 which, in turn, has an output connected to the K or reset gate of JK flip flop 110. The AC set/reset C input of flip flop 110 is connected to the not trap output of the trap control routine to gate the information from out bus 16 line C1 into flip flop 110 at the end of each trap control routine. In like manner out bus 16 lines M1 and M2 are connected to an input of AND gates 116 and 120 respectively. A second input of AND gates 116 and 118 is connected to out bus 16 line C1. The outputs of AND gates 116 and 120 are connected to the J inputs of modifier micro-order flip flops 114 and 118 respectively. The AC set/reset C inputs of flip flops 114 and 118 are connected to the not trap output of the trap control routine to gate base scan rate and horizontal scan direction operating parameters into modifier micro-order flip flops 114 and 118 at the end of each trap control routine that has retrieved a prescan microinstruction. The output of prescan flip flop 110 is connected to first inputs of prescan raster control gate 122, horizontal prescan direction gates 124 and 126 as well as sequencing gates 128 through 136, 140, and 142. A second input of gate 122 is connected to a VSR 33-24 output from the system timing circuitry of sequence control 40. VSR 33-24 is at an up level from VSR 33 time through VSR 24 time of each vertical scan ring counter rotation to generate a raster output signal from gate 122 which controls the vertical scanning of scanner 22. Delays inherent in the scanner deflection drive circuits require that a vertical scan be initiated sometime before vertical sampling begins. Thus although video data from scanner 22 is sampled between VSR 1 and VSR 32, the raster signal provided by AND gate 122 leads sampling by eight VSR time periods. Second inputs of AND gates 124 and 126 are connected to the ON and OFF outputs of modifier micro-order flip flop 118 respectively to provide a horizontal scan right or scan left output of scanner 22. Third inputs of gates 124 and 126 are connected to the output of inverter 138 which has an input connected to VSR 33-24 to allow horizontal scanning only during the retrace portion of each vertical scan. Third inputs of sequencing gates 132 and 136 are connected to the MCR output from filter 24 to initiate prescan width computing when the minimum number of dark bits that indicate a character is being scanned have been detected. Second inputs of gates 128, 130, 132, 134, and 136 are connected to the VSR 33 timing signal to only allow width scan count update at the end of each vertical scan. Gates 130, 132, and 134 each have another connected to clock 1, 2, and 3 signals respectively to update the horizontal width scan count. AND gate 136 moves the data in the auxiliary register from this scan to the profile register to build a vertical profile of the character being scanned. The output of AND gate 128 is wired to a plurality of address bus 12 lines to encode the address of accumulator buffer storage location one in local store 10 where the running horizontal width count is stored as a temporary result. AND gate 142 has a second input connected to the output of inverter 144 which has an input connected to MCR output of data filter 24. The output of AND gate 142 resets accumulator 32 prior to beginning the count of prescans. AND gate 140 has a second input connected to segment output of data filter 24 and generates a prescan end signal which is connected to OR gate 54 of FIG. 2.

Figure 4A:
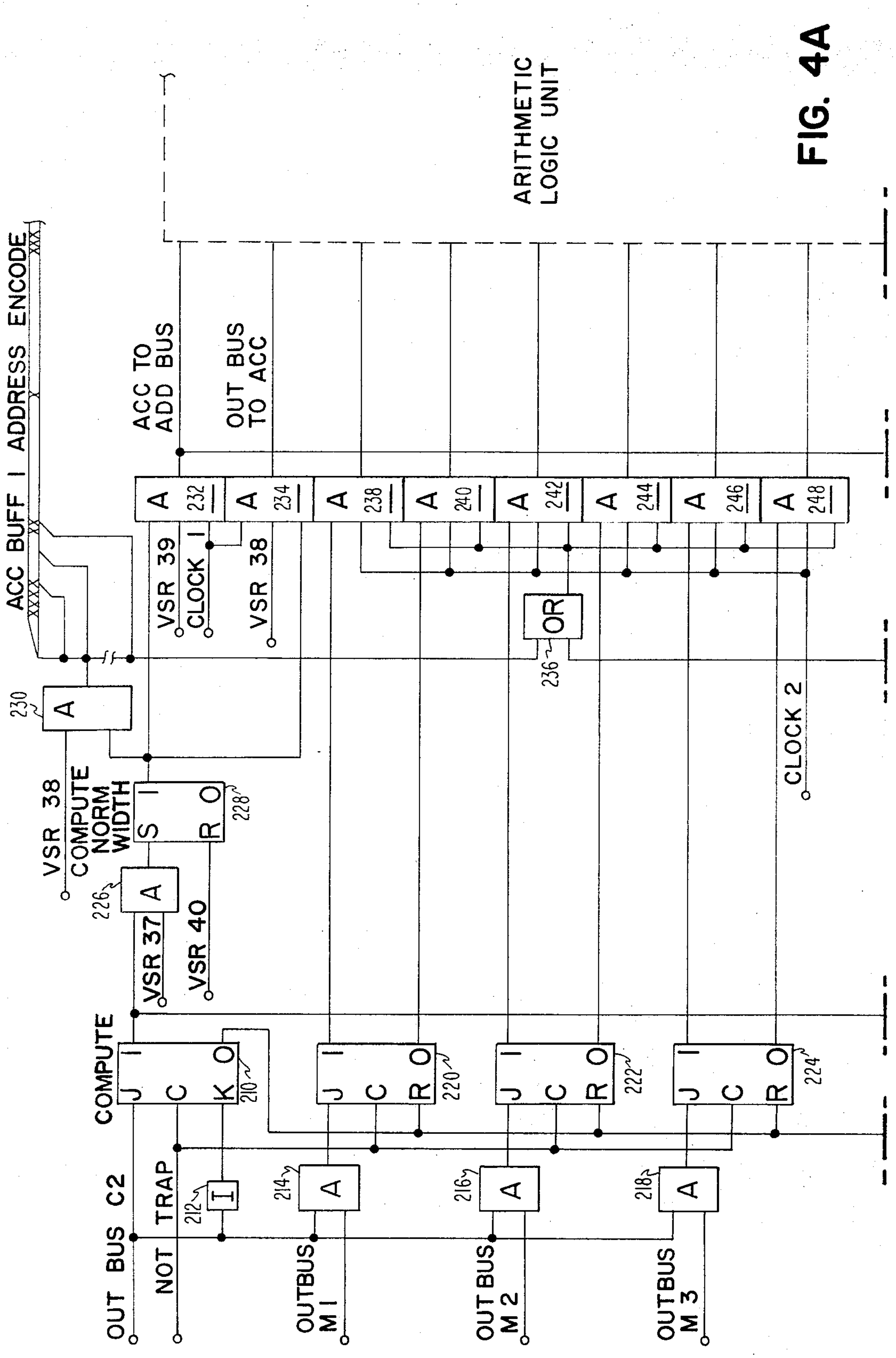
FIGS. 4A and 4B show a discrete logic compute normalization and centering routine having utility in controlling a character reader.
Figure 4B:
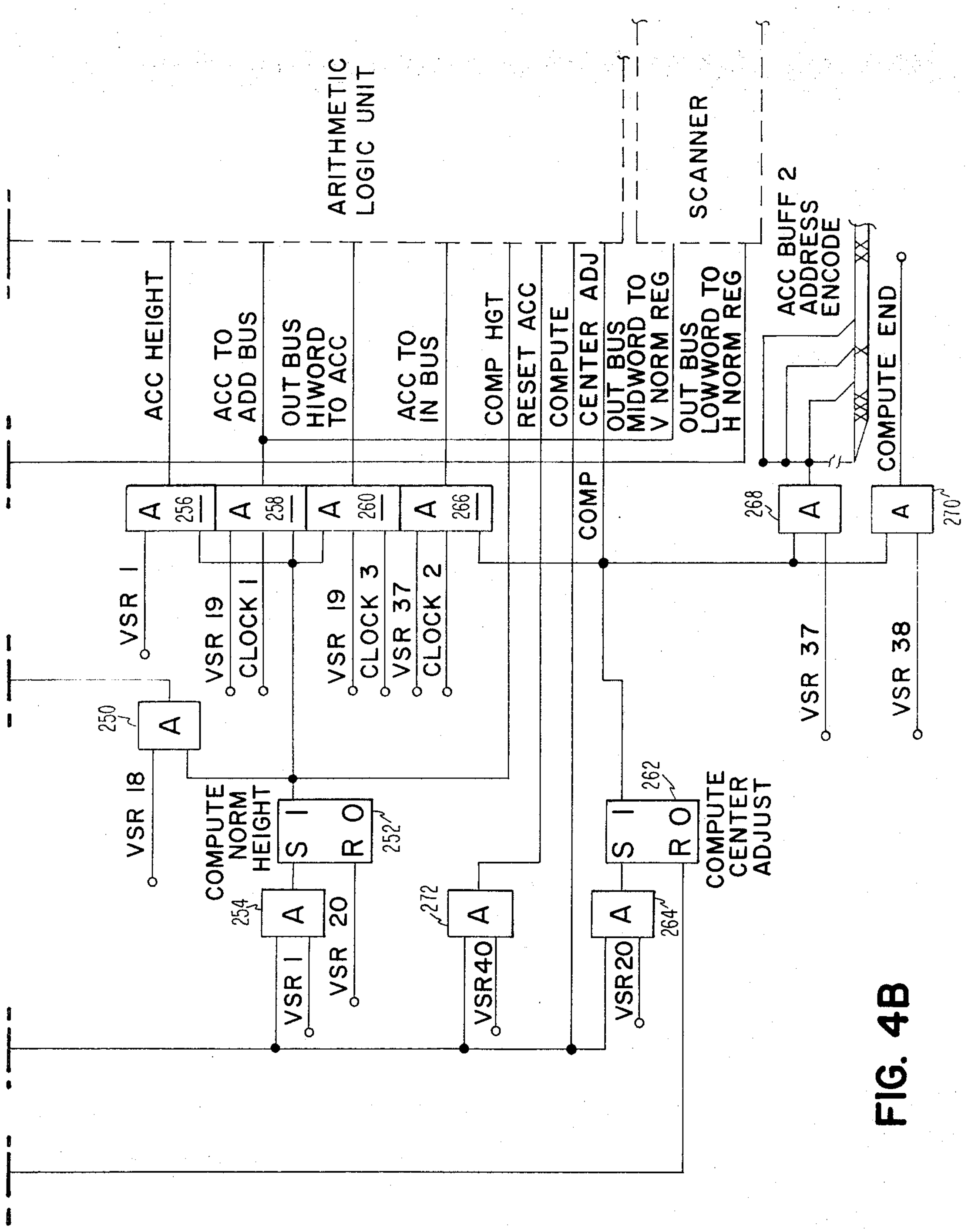

Referring now to FIG. 4, the compute control routine contained within sequence control 40 will be described in detail. A compute micro-order flip flop 210 is provided, having a J input connected to out bus line C2 and a C input connected to the OFF side of trap flip flop 50, labeled "not trap," in order to set flip flop 210 at the end of each trap control routine whenever the microinstruction then on out bus 16 includes a bit on line C2. The out bus line C2 is also connected to the input of inverter 212 and to a first input of AND gates 214, 216, and 218. The output of inverter 212 is connected to the K input of compute flip flop 210 in order to reset flip flop 210 on the next microinstruction which does not include a one bit on line C2. The output of AND gates 214, 216, and 218 are connected to the J inputs of modifier micro-order flip flops 220, 222, and 224. Flip flops 220, 222, and 224. Flip flops 220, 222, and 224 will store address modifier bits which will be used to modify an address in accumulator 32 so that the proper normalization translate table in local store 10 will be used for normalizing the recognition scan of a character to be read. The second inputs of each of AND gates 214, 216, and 218 are connected to out bus lines M1, M2, and M3 respectively to set flip flop 220, 222, and 224 whenever one bits are present on these lines at the end of the trap control routine which sets flip flop 210. This is accomplished by connecting the C inputs of each of flip flops 220, 222, and 224 to the OFF output of trap flip flop 50 labeled "not trap." The OFF output of compute flip flop 210 is connected to the DC reset inputs of flip flops 220, 222, and 224 to force them into a reset condition whenever flip flop 210 is reset. Flip flops 210, 220, 222, and 224 store the compute micro-orders allowing out bus 16 to be used for computation during the compute control routine.

Several normalization translate tables are stored within local store 10. Each normalization translate table corresponds to the aspect ratio and data matrix size required for recognizing characters of a particular form such as hand printing, A font, and so forth. The proper table is selected under control of the modifier bits of the compute microinstruction by force loading the higher order bits of the normalization translate table entry address within accumulator 32 after that address has been generated. Each normalization translate table entry is divided into three subwords corresponding to horizontal and vertical normalization values and a high order subword corresponding to the centering adjustment required for the related vertical normalization value. Inasmuch as it will be unusual for a character to have exactly the same number of vertical samples as it has horizontal prescans, different normalization translate table entries will usually be addressed for each horizontal and each vertical normalization computation.

The first step in the sequence of computing the normalization and centering parameters which define the size and location of the recognition scan is initiated by setting normalization width latch 228 through AND gate 226. AND gate 226 has a first input connected to the output of compute latch 210 and a second input connected to VSR 37 timing signal. VSR 30 timing signal is connected to the reset input of latch 228. The ON output of latch 228 is connected to a first input of AND gates 230, 232, and 234. VSR 38 timing signal is connected to a second input of AND gates 230 and 234. The output of AND gates 230 is connected to a first input of OR gate 236. The output of AND gate 230 is also connected to a plurality of address bus 14 lines in such a way as to encode the address of accumulator buffer one which contains the horizontal width scan count. Clock 1 timing signal is connected to a second input of AND gates 232 and 234. The output of AND gate 234 is connected to gates within accumulator 32 to gate the digital information on out bus 16 into accumulator 32. The output of OR gate 236 is also connected to first inputs of AND gates 238, 240, 242, 244, 246, and 248. AND gates 238, 242, and 246 have second inputs connected to the ON output of flip flops 220, 222, and 224 respectively. AND gates 240, 244, and 248 have second inputs connected to the OFF outputs of flip flop 220, 222, and 224 respectively. Clock 2 timing signal is connected to third inputs of AND gates 238 through 248. The outputs of AND gates 238 through 248 are connected to the high order stages of accumulator 32 to force digital bits into these stages corresponding to the modifier bits received with the compute microinstrution in order to address the proper normalization translate table within local store 10. invention.

After the horizontal width prescan count stored in accumulator buffer one has been loaded into accumulator 32 and the higher order bits of accumulator 32 have been set to correspond with the proper normalization translate table within local store 10, the address within accumulator 32 is gated out onto address bus 12. This function is controlled by timing signals VSR 39 and clock one which are connected to second and third inputs of AND gate 232 respectively. The output of AND gate 323 is also connected to scanner 22 in order to gate the low order bits of the addressed normalization translate table entry from out bus 16 into the horizontal normalization register 936 in order to provide scanner 22 with the proper horizontal scan rate which will be used during a later recognition scan.

The second step in the sequence of computing the normalization and centering parameters, is initiated by setting normalization height latch 252 through AND gate 254. A first input of AND gate 254 is connected to the ON output of compute flip flop 210 and VSR 1 timing signal is connected to a second input of AND gate 254. VSR 20 timing signal is connected to the reset input of normalization height latch 252. The output of normalization height latch 252 is connected to AND gate 250. Timing signal VSR 18 is connected to a second input of AND gate 250 and the output of AND gate 250 is connected to a second input of OR gate 236 and previously described in order to force the high order bits of the address within accumulator 32 to correspond with modifier bits stored in flip flops 220, 222, and 224 so that the proper normalization translate table within local store 10 will be addressed. The ON output of normalization height latch 252 is also connected to first input of AND gates 256, 258, and 260. Timing signal VSR 1 is connected to the second input of gate 256 which has an output connected to set inputs of latches 828 and 830 shown in FIG. 8 to initiate logical computation of the height of the character represented by the profile within profile register 36. AND gate 272 having inputs from compute flip flop 210 and VSR 40 rests accumulator 32 prior to this computation. Timing signals VSR 19 and clock 1 are connected to second and third inputs of AND gate 258 respectively. Timing signals VSR 19 and clock 3 are connected to second and third inputs respectively of AND gate 260. The output of AND gate 258 is connected to a control gate within accumulator 32 for gating the address generated within accumulator 32 for gating the address generated within accumulator 32 onto address bus 12. AND gate 258 also provides a signal to scanner 22 for gating the middle order bits of the address normalization translate table entry from out bus 16 into the vertical normalization register 934 of FIG. 9 in order to provide a normalized scan rate during a subsequent recognition scan.

A third step in the sequence computing the normalization and centering parameters is initiated by setting center adjust latch 262 through AND gate 264. AND gate 264 has a first input connected to the ON output by compute flip flop 210. VSR 20 timing signal is connected to a second input of AND gate 210. The reset input of latch 262 is connected to the OFF output of compute flip flop 210. The ON output of latch 262 is connected to first inputs of NAD 266, 268, and 270. VSR 37 timing signal is connected to second input of AND gate 266 and 268 while VSR 38 time signal is connected to a second input of AND gate 270. The output of AND gate 268 is connected to a plurality of lines of address bus 12 in a predetermined pattern to encode the address of accumulator buffer 2 in local store 10. AND gate 266 has a third input connected to clock 2 timing signal and an output connected to control gates within accumulator 32 for gating the contents of accumulator 32 onto in bus 14 for storage into accumulator buffer 2. The output of the AND gate 270 labeled compute end is connected to another input of OR gate 54 of the trap routine shown in FIG. 2, which initiates retrieval of the next microinstruction.

Figure 5:
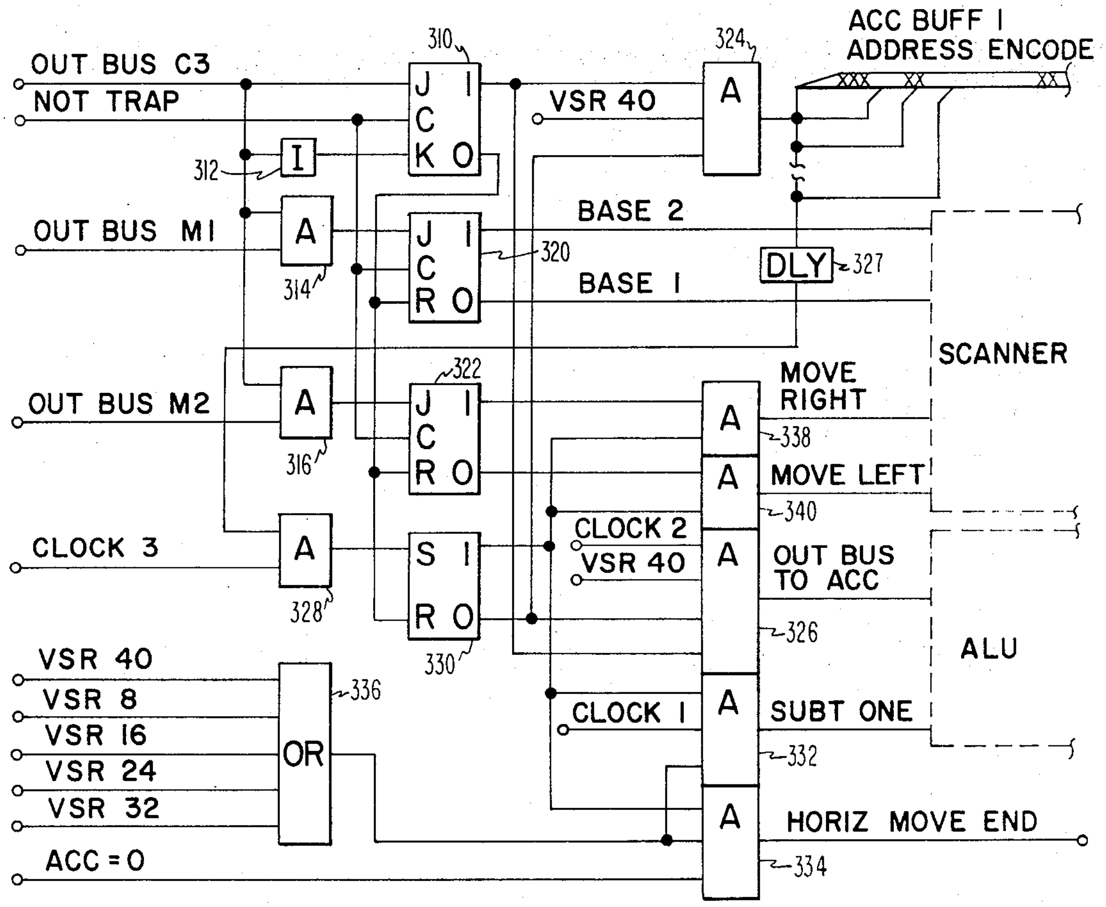
FIG. 5 shows a discrete logic more horizontal control routine.

Referring now to FIG. 5, the move horizontal control routine contained within sequence control 40 will be described in detail. The pertinent micro instruction bits placed on out bus 16 by trap control routine are again loaded into micro-order flip flops. Out bus 16 line C3 is connected to the J input of move horizontal flip flop 310, the input inverter 312, and to first inputs of AND gates 314 and 316. AND gates 314 and 316 have second inputs connected to out bus lines M1 and M2 respectively. The output of inverter 312 is connected to the K input of flip flop 310 while the outputs of AND gates 314 and 316 are connected to the J input of flip flops 320 and 322 respectively. The micro-order bits on out bus 16 are stored into flip flops 310, 320 and 322 at the end of a trap control routine by the not trap signal received from trap flop flop 50 which is connected to the C inputs of flip flops 310, 320 and 322. The outputs of flip flops 320 are connected to scanner 22. The outputs of flip flop 320 select between base scanning rates one and two corresponding to anticipated machine written and hand printed character sizes respectively. The outputs of flip flop 322 are also connected to scanner 22 through AND gates 338 and 340. The OFF output of flip flop 322 indicates a move to the left and the ON output indicates a move to the right. The OFF output of flip flop 310 is connected to DC reset inputs of flip flops 320 and 322 and latch 330 to force them to a reset condition whenever move horizontal flip flop 310 is reset. The ON output of flip flop 310 is connected to a first input of AND gates 324 and 326. Timing signal VSR 40 is connected to a second input of AND gates 324 and 326. The output of AND gate 324 is connected to the predetermined lines of address bus 12 to encode the address of accumulator buffer 1 which has been previously loaded with a move distance. The move distance can be the width of a character in the form of the number of prescans detected during the prescan routine. A clock 2 timing signal is connected to a third input of AND gate 326 to provide an output to accumulator 32 which opens data gates to transfer the count on out bus 16 which has been retrieved from accumulator buffer 1 into accumulator 32. The number of prescans detected during the prescan routine has now been stored in accumulator 32. To insure that the accumulator is loaded only once, latch 330 is set by AND gate 328 at clock 3 time. AND gate 328 has a first input connected to the output of gate 324 through a delay circuit 327, and a second input connected to system timing clock 3. Delay 327 merely avoids a potential logic race condition and may not need to be a discrete circuit if logic propagation delays for the logic family being used are long enough to avoid a race. The output of latch 330 is connected to another input of each of gates 324 and 326 to inhibit multiple loading of accumulator 32. The ON output of latch 330 is connected to inputs of AND gates 332, 334, 338, and 340. The outputs of gates 338 or 340 allow the scanner 22 to move either right or left while latch 330 is set. AND gate 332 has a second input connected to system timing clock 1 and a third input connected to the output of OR gate 336 which in turn has the five system timing inputs of VSR 40, VSR 8, VSR 16, VSR 24, and VSR 32. The output of OR gate 336 is also connected to an input of AND gate 334 which has another input for receiving a signal from accumulator 32 when the accumulator contains a zero. The output of gate 332 is connected to accumulator 32 as a direct control line to subtract one whenever eight vertical scan ring time periods have passed. The output of AND gate 334 is connected yo OR gate 54 of the trap routine logic to set trap flip flop 50 when the accumulator has been counted down to zero.

Figure 6:
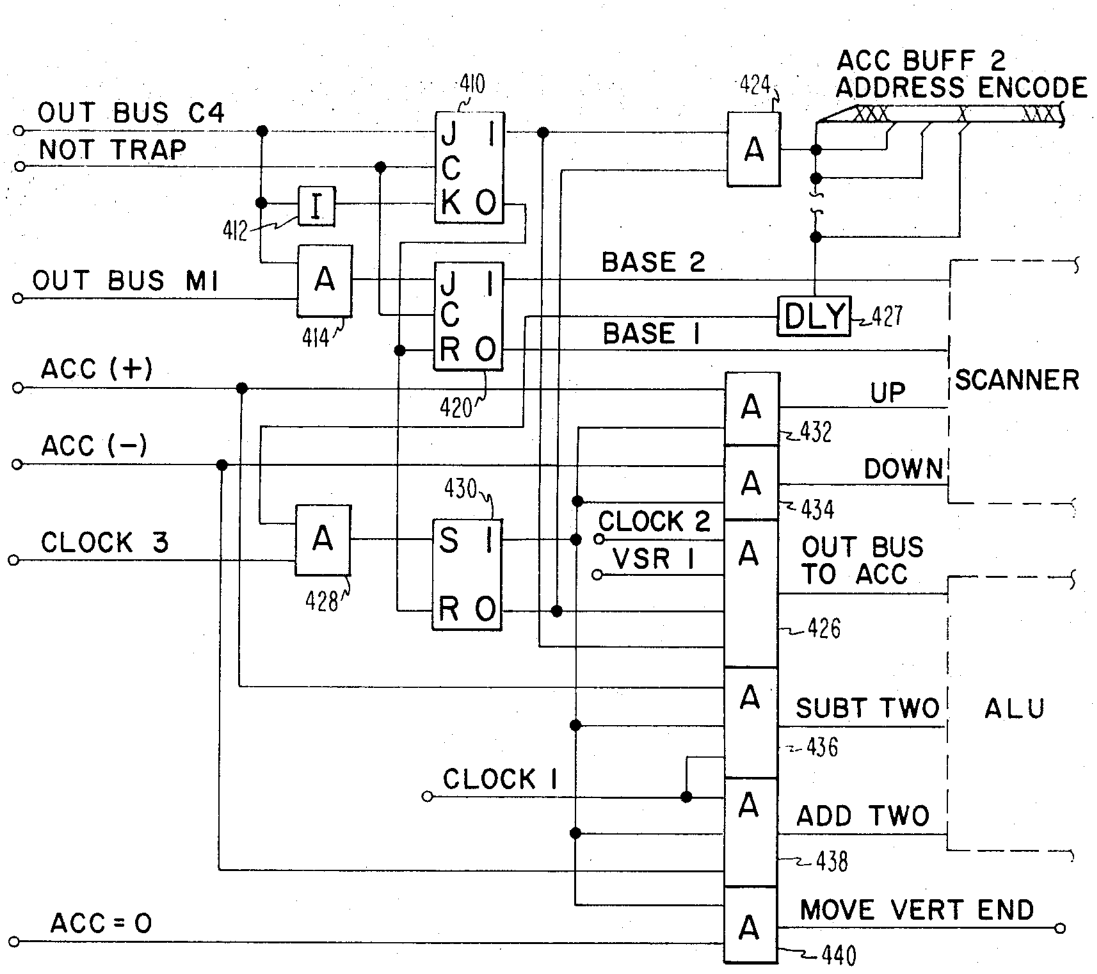
FIG. 6 shows a discrete logic more horizontal vertical control routine.

Referring now to FIG. 6, the move vertical control routine contained within sequence control 40 will be described in more detail. The pertinent microinstruction bits placed on out bus 16 by the trap control routine are again loaded into micro-order flip flops. Out bus 16 line C4 is connected to the J input of move vertical flip flop 410, the input of inverter 412 and to a first input of AND gate 414. AND gate 414 has a second input connected to out bus 16 line M1. The output of inverter 412 is connected to the K input of flip flop 410 while the output of AND gate 414 is connected to the J input of flip flop 420. The micro-order bits on out bus 16 are stored into flip flop 410 and 420 at the end of a trap control routine by the not trap signal received from trap flip flop 50 which is connected to the C inputs of flip flops 410 and 420. The outputs of flip flop 420 are connected to scanner 22. The outputs of flip flop 420 select between base scanning rates one and two corresponding to machine printed or hand printed character sizes respectively. The OFF output of flip flop 410 is connected to the DC reset input of flip flop 420 and latch 430 to force them to a reset condition whenever move vertical flop flip 410 is reset. The ON output of flip flop 410 is connected to a first input of AND gates 424 and 426. The output of AND gate 424 is connected to the plurality of predetermined lines of addres bus 12 to encode the address of accumulator buffer 2 which as been loaded with a double count of move vertical scan ring time intervals. The move distance can be the center adjustment which was computed and stored in accumulator buffer 2 during the compute routine. A clock 2 timing signal is connected to a third input of AND gate 426 to provide an output to accumulator 32. The number of vertical scan ring time intervals to be moved at a predetermined base scan rate has now been stored in accumulator 32. To ensure that the accumulator 32 is loaded only once, latch 430 is set by AND gate 428 at clock 3 time. AND gate 428 has a first input connected to the output of gate 424 through a delay circuit 427 and a second input connected to system timing clock 3. Delay 427 merely avoids a potential logic race condition and may not need to be in the form of a discrete circuit if logic propagation delays for the logic family being used are long enough to avoid a race condition. The OFF output of latch 430 is connected to another input of each of gates 424 and 426 to inhibit multiple loading of accumulator 32. The ON output of latch 430 is connected to inputs of AND gates 432, 434, 438, and 440. The outputs of gates 432 or 434 allow the scanner 22 to move either down or up respectively while latch 430 is set. AND gates 436 and 438 each have a second input connected to system timing clock 1 and a third input connected to an accumulator positive ACC(+) and accumulator negative ACC(−) signal from accumulator 32 respectively. The outputs of gates 436 and 438 are connected to accumulator 32 in order to add two each time a vertical scan ring time interval has passed while the scanner is moving down, and to subtract two each time a vertical scan ring time interval has passed while the scanner is moving up. AND gate 440 has another input for receiving a ACC=0 signal from accumulator 32 when the accumulator contains a zero. The output of gate 440 is connected to OR gate 54 of the trap control logic to set trap flip flip 50 when the accumulator has been counted down to zero while moving down or up to zero while moving up, thus terminating control of move vertical routine.

Figure 7:
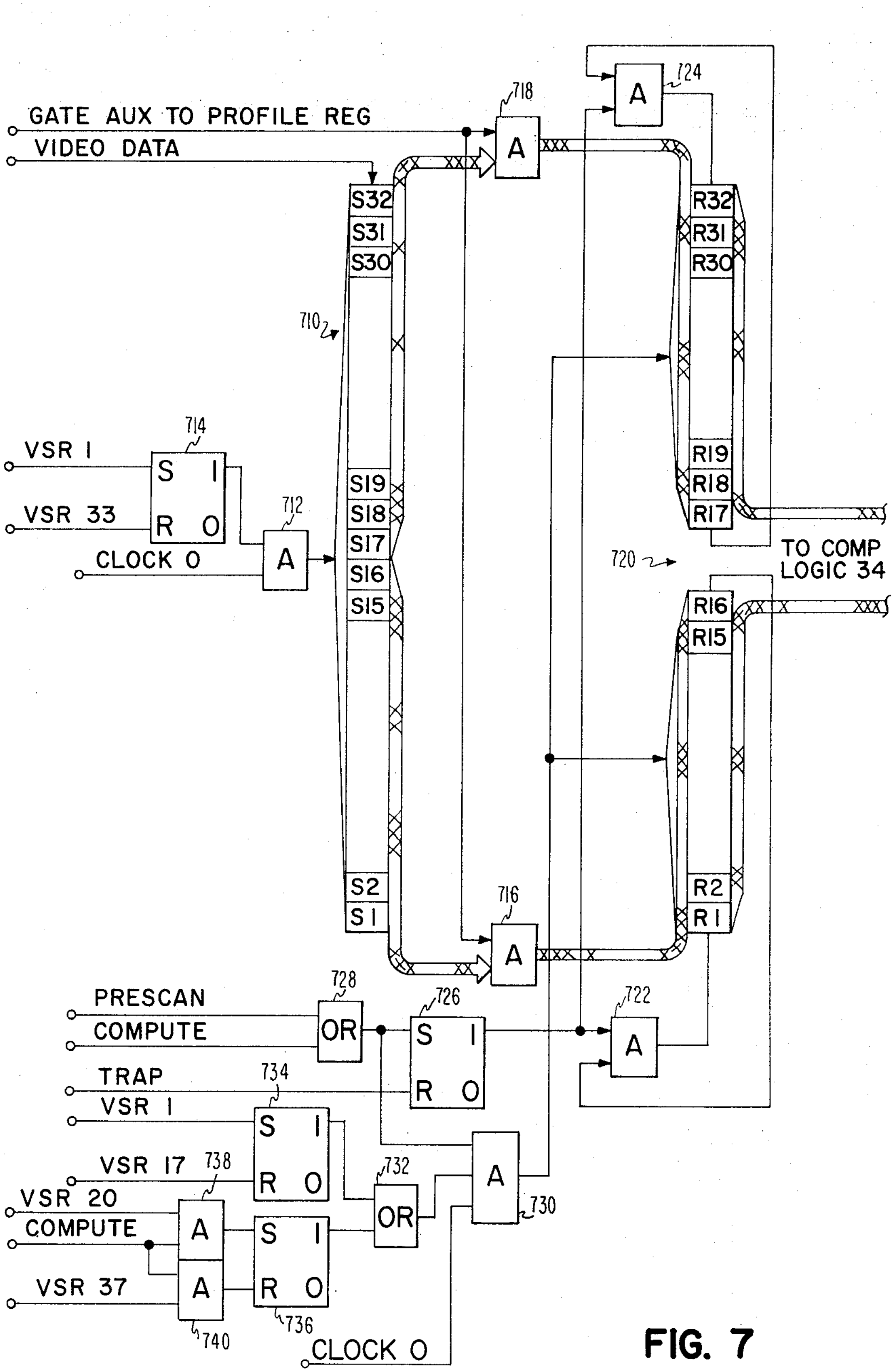
FIG. 7 shows data profile generating circuitry particularly useful in this invention which includes a center directed profile register in order to move efficiently compute normalization and centering values.

A detailed diagram of the auxiliary and center directed registers comprising profile generator 36 of arithmetic logic unit 30 is shown in FIG. 7. Video data from filter 24 of character reader 20 is provided on the video data line which is connected to the data input gate of stage S32 of auxiliary register 710. Each of stages S32 through S1 are connected as a shift register so that data bits entering register 710 at stage S32 propagate downward toward stage S1. Video data is shifted into register 710 under control of a shift input from AND gate 712 which is connected to the shift input of each stage of register 710. AND gate 712 has a first input connected to the ON output of latch 714. Latch 714 is set by VSR 1 timing signal and reset by VSR 33 timing signal so that data bits can be shifted into register 710 during sampling times 1 through 32 of each vertical scan. Profile generator 36 also receives gate auxiliary to profile register signal on a direct control line from prescan control routine of FIG. 3 which is connected to a first input of the groups of 16 AND gates 716 and 718. A signal will be present on this line at VSR 33 time whenever the minimum number of dark data samples which indicates a character is present in a vertical scan has been detected. AND gates 716 each have second inputs connected to a different one of stages of S1 through S16 of register 710. AND gates timing, each have a second input connected to a different one of stages S18 through S32 of register 710.

In order to accumulate a profile of a character being scanned as well as to facilitate location of the center of the character, a center directed shift register 720 is provided which has an upper and a lower section. Each output of AND gates 716 having inputs from S1 through S16 is connected to a DC set input to stages R1 through R16 of the lower section of register 720 respectively. Each output of AND gates 718 having inputs from S17 through S32 is connected to DC set input to stages R17 through R32 of the upper section of register 720 respectively. The DC reset inputs of stages R1 through R32 are not utilized, therefore once a stage has been set, it will not be reset by light video samples from subsequent scans allowing a profile of the entire character to be built up during execution of a prescan routine. Each of states R1 through R32 of register 720 has ON and OFF outputs which are connected to the inputs of compute logic 34 allowing logic decision trees to locate the center of the profile of a character within the prescanned area to the exclusion of dark samples of from dirt, ink smears or extraneous portions of characters which may also be within the prescanned area. Register 720 is recirculated from Stage R1 toward R16 and from stage R32 toward stage R17 under control of AND gates 722 and 724 respectively. The output of AND gate 722 is connected to the data input gate of stage R1 and the output of AND gate 724 is connected to the data input of stage R32. AND gates 722 and 724 have first inputs connected to the data output of stages R16 and R17 respectively. AND gates 722 and 724 each have second inputs connected to the ON output of latch 726. Latch 726 is set by the output of OR gate 728 which has a first input connected to the ON output of prescan flip flop 110 and a second input connected to the ON output of compute flip flop 210. Latch 726 is reset by the ON output from trap flip flop 50 at the end of each discrete logic control routine. Each of stages R1 through R32 has a shift input connected to the output of AND gate 730 for shifting the profile within profile register 720. AND gate 730 has a first input connected to the output of OR gate 728 and a second input connected to the output of OR gate 732. AND gate 730 has a third input connected to clock 0 timing signal to shift profile register 720. OR gate 732 has a first input connected to the ON output of latch 734 and a second input connected to the ON output of latch 736. Latch 734 is set by VSR 1 timing signal and is reset by VSR 17 timing signal. Latch 736 is set by the output of AND gate 728 and is reset by the output of AND gate 740. AND gate 738 and 740 each have a first input connected to VSR 20 and VSR 37 timing signals respectively, and a second input connected to the ON output of compute flip flop 210 from the discrete logic compute control routine shown in FIG. 4.

Figure 8A:
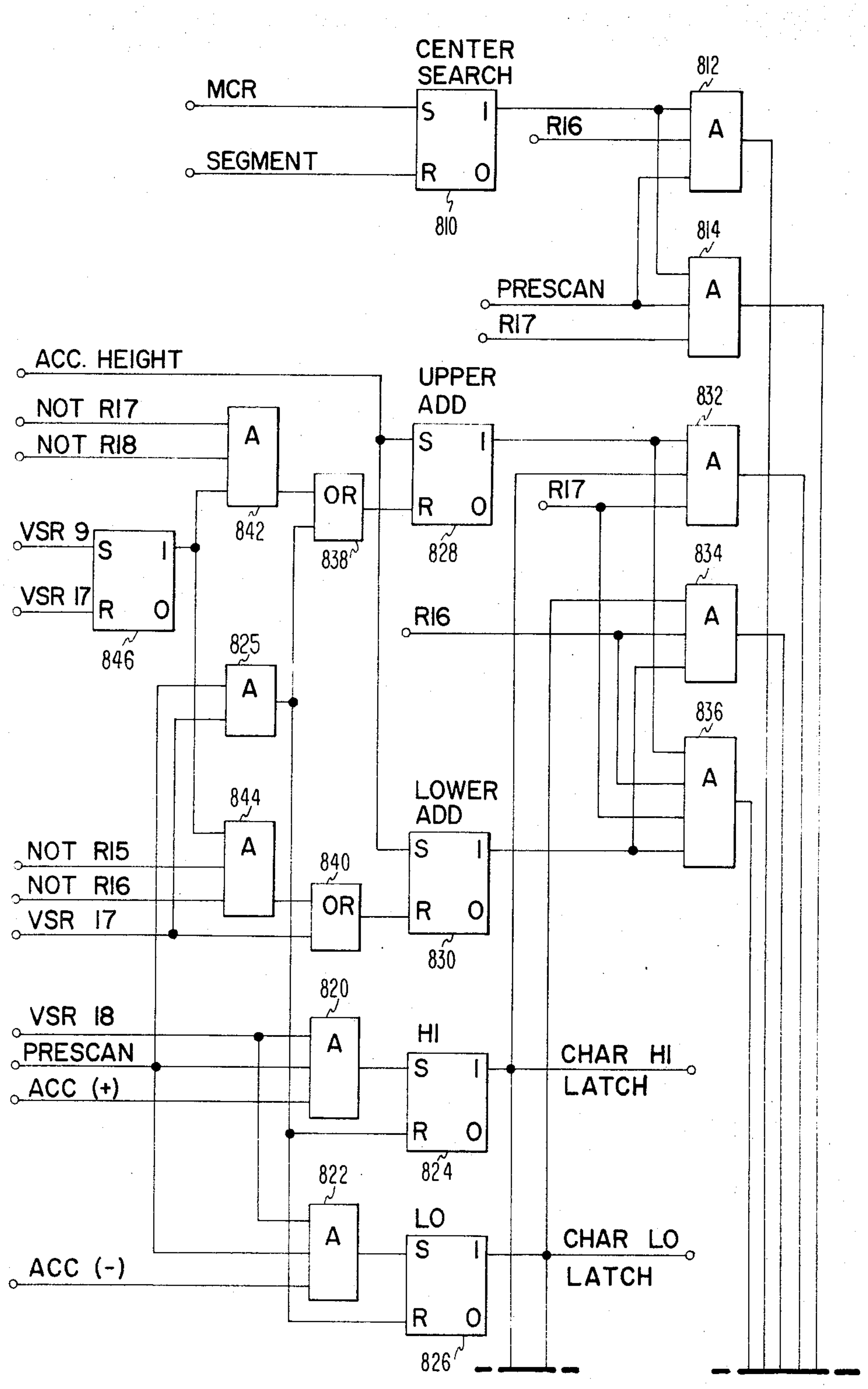
FIGS. 8A and 8B show logic tree networks connected to the profile register of FIG. 7 for generating the normalization and centering values under control of the discrete control routine of FIG. 4.
Figure 8B:
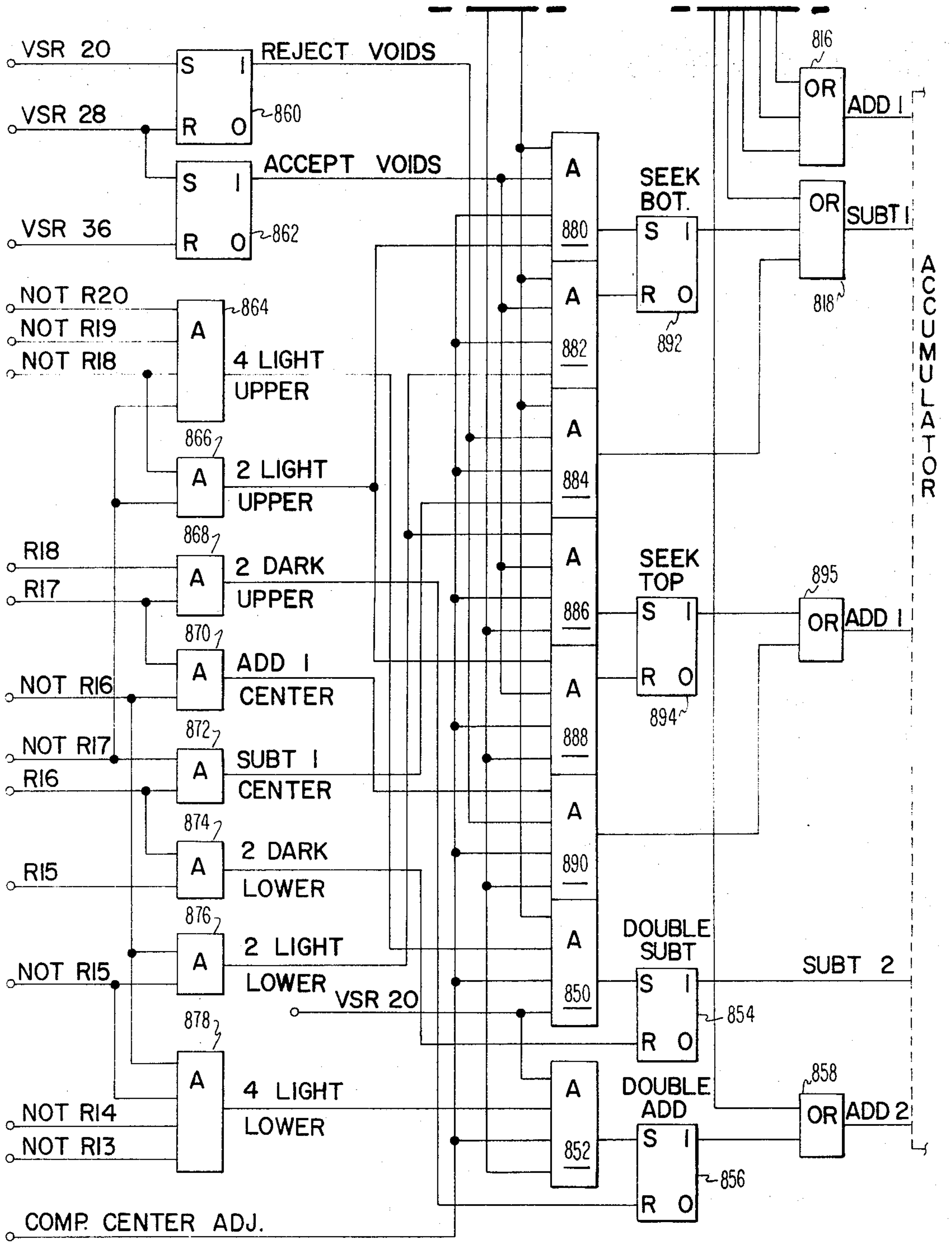

The detailed circuitry of compute logic 34 will now be described with reference to FIG. 8. While a discrete logic prescan control routine is being executed, a running tally is being maintained within accumulator 32 indicating the relative position of the center of a character within the prescanned area, with respect to the center of the prescan area. This control function utilizes center search latch 810 which has a set input connected to the MCR line and a reset input connected to the segment line. Both MCR and segment lines originate in data filter 24 and provide a signal when the beginning and the end of a character has been detected respectively. Center search latch 810 is therefore in an ON condition whenever a character is being scanned. The ON output of center search latch 810 is connected to a first input of each of AND gates 812 and 814. AND gates 812 and 814 each have a second input connected to the ON output of prescan flip flop 110. AND gate 812 has a third input connected to the ON output of stage R16 of profile register 720. AND gate 814 has a third input connected to the ON output of stage R17 of profile register 720. The output of AND gate 812 is connected to an input of OR gate 818, the output of which is connected to the subtract one input of accumulator 32. The output of AND gate 814 is connected to an input of OR gate 816. The output of OR gate 816 is connected to the add one input of accumulator 32. The output on AND gate 812 subtracts one from the count accumulator 32 whenever a dark bit is present in register 720 stage R16 while AND gate 814 adds a count to accumulator 32 whenever a dark sample is present in register 720 stage R17. Center directed shift register 720 is recirculated while AND gates 812 and 814 are active so that a final result is accumulated in accumulator 32 which indicates the position of the center of a character within the prescanned area relative to the center of the prescanned area. Accumulator 32 has an accumulator positive ACC(+) output which is active whenever the contents of accumulator 32 is positive and an accumulator negative ACC(−) output which is active whenever the contents of accumulator 32 is negative. The accumulator positive and the accumulator negative outputs from accumulator 32 are connected to the first inputs of AND gates 820 and 822 respectively. AND gate 820 and 822 each have a second input connected to the ON output of prescan flip flop 110 and a third input connected to VSR 18 timing signal. The output of each of AND gates 820 and 822 is connected to the set input of high latch 824 and low latch 826 respectively. Latches 824 and 826 each have a reset input connected to the output of AND gate 825 which has a first input connected to the ON output of prescan flip flop 110 and a second input connected to VSR 17 timing signal to reset latches 824 and 826 just prior to their being set at VSR 18 time. AND gates 812 and 814 and latches 824,826 are active during each prescan so that when the last prescan has been completed, the position of the center line of a character within the prescan area with respect to the center line of the prescan area ia available in latches 824 and 826.

After the prescan routine has been completed, the accumulate height signal from discrete logic compute control routine of FIG. 4 sets upper add latch 828 and lower add latch 830, to determine the height of the character. The ON output of latch 828 is connected to first input of AND gates 832 and 836. A second input of AND gate 832 is connected to the ON output of high latch 824. A third input of AND gate 832 is connected to the output of profile register 720 stage R17, while the output of AND gate 832 is connected to another input of OR gate 816. A first input of AND gate 834 is connected to the ON output of low latch 826. A second input of AND gates 834 and 836 is connected to the output of latch 830 while each of third inputs of AND gates 834 and 836 are connected to the output of profile register 720 stage R16. The output of AND gate 834 is connected to another input of OR gate 816 while the output of AND gate 836 is connected to an input of OR gate 858. Latches 828 and 830 are reset by outputs from OR gates 838 and 840 respectively. A first input of each of OR gates 838 and 840 is connected to VSR 17 timing signal. A second input to OR gate 838 is connected to the output of AND gate 842 while a second inpout to OR gate 840 is connected to the output of the AND gate 844. AND gate 842 has first and second inputs connected to the OFF outputs of profile register 720 stages R17 and R18 respectively. AND gate 844 has first and second inputs connected to OFF outputs of profile register 720 stages R15 and R16 respectively. Each of AND gates 842 and 844 have a third input which is connected to the ON output of threshold latch 846. Threshold latch 846 is set by VSR 9 timing signal and reset by VSR 17 timing signal.

After the height count of the character has been determined, sequencing gates 258 and 260 shown in FIG. 4 translate the height count into a vertical scan rate normalization value which is sent to scanner 22 and a "normalization center adjustment" which is stored in accumulator 32. The normalization center adjustment is the vertical distance that the starting position of the recognition scans must be moved upward in order to keep the normalized recognition raster centered within the area which was prescanned. In addition to centering adjustment required because of normalization, the starting position of the recognition scans must be adjusted to center the recognition raster over the character which may be located anywhere above or below the center line of the prescanned area. This additional adjustment is called "prescan center adjustment" and the profile of the character, which was stored in profile register 720 while the discrete logic prescan control routine was being executed, is used to generate the prescan center adjust count which is added on top of the normalization center adjust count already in accumulator 32. If the profile of the character is completely below or completely above the center line of the prescanned area, AND gates 850 and 852 will set latch 854 or latch 856 respectively. The ON output of latch 856 is connected to an input of OR gate 858. The output of gate 858 is connected to accumulator 32 to add two counts to the contents of the accumulator during each VSR time. The ON output of latch 856 is connected to accumulator 32 to subtract two counts from the contents of the accumulator during each VSR 1 time. AND gate 850 has inputs connected to the ON output of character low latch 826, the output of AND gate 864 which indicates that the first four data samples above the center line of the prescanned area contained no dark bits. The ON output of computer center adjust latch 262, and VSR 20 timing signal. AND gate 852 has inputs connected to the ON output of character high latch 824, the output of AND gate 878 which indicates that the first four data samples below the center line of the prescan area contained no dark bits, the ON output of compute center adjust latch 262, and VSR 20 timing signal. A second input to OR gate 858 is connected to the output of AND gate 836. AND gate 864 has inputs connected to the OFF outputs of stages R17 R18, R19, and R20 of profile register 720. AND gate 878 has inputs connected to the OFF output of stages R13, R14, R15, and R16 of profile register 720. Latch 854 is reset when profile register 720 has been shifted that number of steps so that the top edge of the profile located in the lower half of the profile register has been moved up to the center line of the profile register. Thus latch 854 is reset by an output from AND gate 874 which has inputs connected to the ON output of stages R15 and R16 of profile register 720. In like manner, latch 856 is reset when the profile register has been shifted that number of steps so that the bottom edge of the character profile located in the upper half of the profile register 720 has been moved down to the center of the register. Thus, latch 856 is reset by an output from AND gate 868 which has input connected to the ON output of stages R17 and R18 of profile register 720. After the top edge of the profile has been shifted up to the center of profile register 720, AND gate 884 having an output connected to an input of OR gate 818, begins adding a count of one to the accumulator for each dark bit contained within the character profile. In order to increase the fidelity of character recognition reject voids latch 860 is set by VSR 20 timing signal at the beginning of the compute center adjust portion of the compute routine. Inasmuch as the probability that a character will be found in the center of the prescanned area is very high as compared with the probability that the top or bottom of a character would be found in the center of the prescan area, it is desirable to recognize light bits in this central area as voids in a character. For the purposes of this embodiment, the central area referred to comprises eight bits above and eight bits below the center line of the prescanned area. Thus, latch 860 is reset by VSR 28 timing signal which also sets latch 862. Latch 862 accepts light bits as the bottom or top of a character inasmuch as this probability is much greater than the probability that such light bits outside of the central area are voids in a character. Latch 862 is reset by VSR 36 timing signal which occurs at the end of the compute center portion of the compute routine. After the profile in profile register 720 has been shifted eight times, seek bottom latch 892 and seek top latch 894 can be set by AND gate 880 and 886 respectively or can be reset by AND gates 882 and 888 respectively. AND gates 880, 882, 886, and 888 each have a first input connected to the ON output of latch 862. AND gates 880 and 882 each have second inputs connected to the ON output of character low latch 826. AND gates 880, 882, 884, 886, 888, and 890 each have a third input connected to the ON output of compute center adjust latch 262. AND gates 880, and 888 each have a fourth input connected to the output of AND gate 866 to set seek bottom latch 892 or reset seek top latch 894 respectively. AND gate 866 has first and second inputs connected to the OFF outputs of stages R15 and R16 of profile register 720. AND gates 882 and 886 each have fourth inputs connected to the output of AND gate 876 which has first and second inputs connected to the OFF outputs of stages R15 and R16 of profile register 720. The ON outputs of latches 892 and 894 are connected to inputs of OR gate 818 and 895 respectively. AND gate 890 has an output which is also connected to an input or OR gate 895. The output of OR gate 895 is connected with OR gate 816 to the subtract input to accumulator 32. AND gates 884 and 890 have a first input connected to the ON outputs of reject void latch 860. AND gate 884 has an input connected to the ON output of character low latch 826 while AND gate 890 has an input connected to the ON output of character high latch 824. AND gate 884 has a fourth input connected to the output of AND gate 872 which has a first input connected to the ON output of stage R16 and a second input connected to the OFF ouput of stage R17 of profile register 720. AND gate 890 has a fourth input connected to the output of AND gate 870 which has a first input connected to the ON output of stage R17 and a second input connected to the OFF output of stage R16 of profile register 720.

Figure 9:
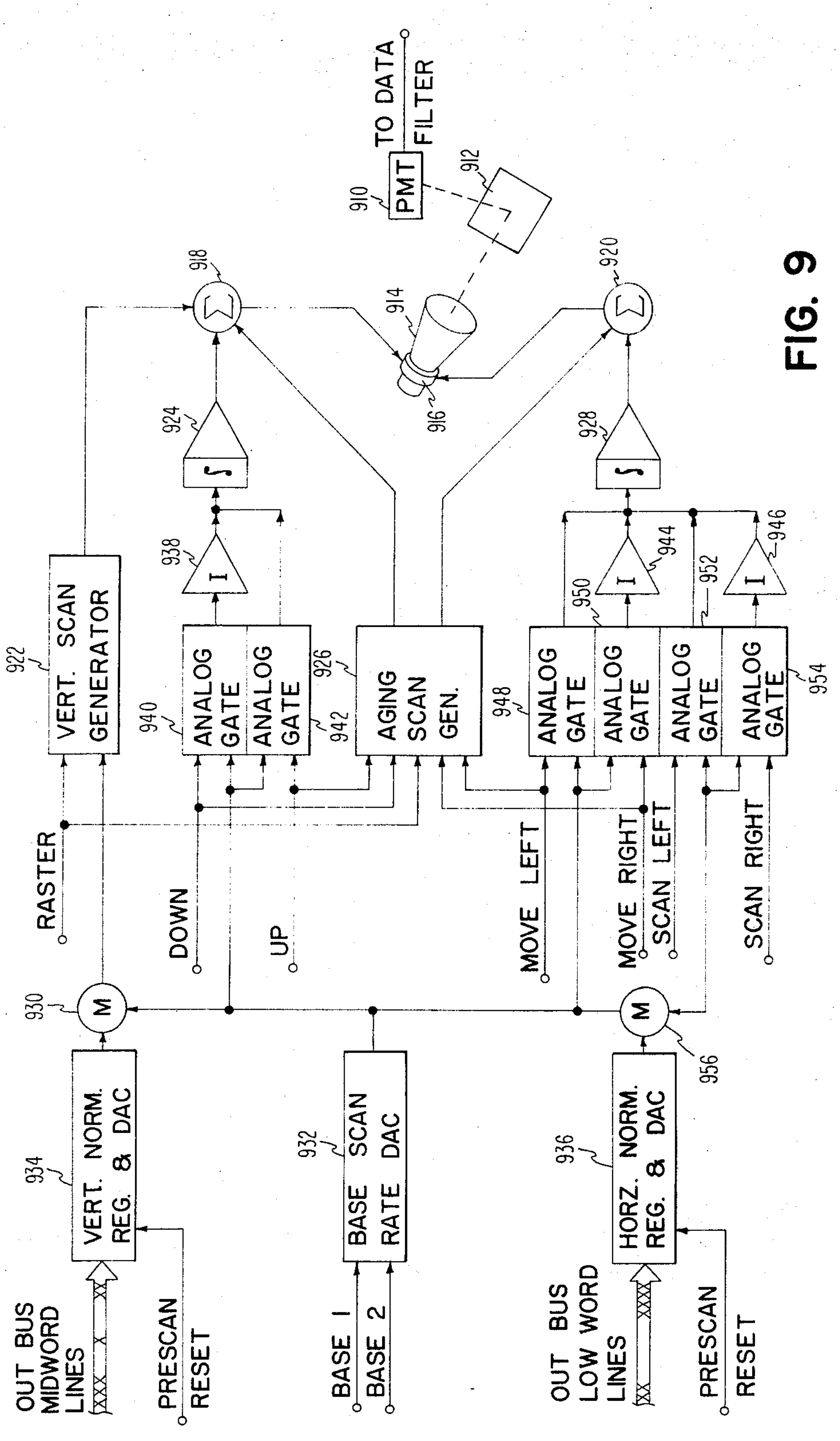
FIG. 9 shows a block diagram of a particular apparatus being controlled, which in the preferred embodiment herein discloses is a character reader and more particularly, a scanner for a character reader.

Referring now to FIG. 9, a block diagram of the operating units of scanner 22 is shown. Photo multiplier tube and amplifier 910 provides a video output signal which is transmitted to data filter 24 where it is sampled once for each VSR count 1 through 32 and filtered prior to being transmitted to recognition processor 26. Photo multiplier 910 receives reflected light from document 912 which was received from cathode ray tube 914. The electron beam of cathode ray tube 914 is deflected by deflection yoke 916 having a vertical input from summing circuit and driver 918 and having a horizontal input from summing circuit and driver 920. Summing circuit 918 adds the output signals from vertical scan generator 922, position determining integrating amplifier 924, and aging scan generator 926. Aging scan generator 926 provides beam deflection signals whenever the beam is not being moved by other deflection controlling signals so that phosphors on the face of cathode ray tube 914 will not be degraded by a stationary electron beam. The output of aging scan generator 926 could alternatively have been connected to the cathode of cathode ray tube 914 to turn off the electron beam whenever it was not being deflected. This second alternative would have resulted in somewhat slower overall operation however. Vertical scan generator 922 has a first input for receiving a raster signal from discrete logic circuitry shown in FIG. 3 or from a discrete logic recognition scan control routine, not shown. Vertical scan generator 922 has a second input connected to the output of multiplier circuit 930 which in turn has a multiplicand input connected to the output of base scan rate DAC (digital-to-analog converter) 932 and a multiplier input connected to the output of vertical normalization register and DAC 934. The output of multiplier circuit 930 controls the height of the vertical scan generator 922. In order to control the starting position of the vertical scan generated by scan generator 922, the input to vertical position integrating amplifier 924 is connected to inverter 938 for receiving a negative input signal and to analog gate 942 for receiving a positive input signal. Inverter 938 has an input connected to analog gate 940. Analog gates 940 and 942 each have an analog inputs connected to the output of base scan rate DAC 932. Analog gate 940 and 942 each have a digital control gate input connected to the down and to the up outputs respectively of discrete logic move vertical control routine shown in FIG. 6. In order to control horizontal beam deflection, the input of horizontal integrating amplifier 928 is connected to the output of inverters 944 and 946 for receiving a negative analog signals and to the output of analog gates 948 and 952 for receiving a positive signals. Inverters 944 and 946 each have an input connected to analog gate 950 and 954 respectively. Analog gates 948 and 950 each have an analog input connected to the output of base scan rate DAC 932. Analog gates 948 and 950 each have a digital gate input connected to move left and connected to move right outputs respectively of discrete logic move horizontal control routine shown in FIG. 5. In like manner, analog gates 952 and 954 each have an analog input connected to the output of multiplier circuit 956 which has a multiplicand input connected to the output of base scan rate DAC 932 and a multiplier input connected to the output of horizontal normalization register and DAC 936. Analog gates 952 and 954 each have a digital gate input connected to scan left and connected to scan right outputs respectively from discrete logic prescan control routine shown in FIG. 3 or from a discrete logic recognition scan control routine not shown respectively. Base scanner rate DAC 932 has first and second inputs connected to base 1 and base outputs from discrete logic prescan, move horizontal, move vertical, and other control routines. The base 1 input will be energized when a machine printed character is being scanned and the base 2 input will be energized when a hand printed character is being scanned to provide a scan area having twice the height and one half of the horizontal resolution for the normally larger hand printed characters. Vertical normalization register and DAC 934 has an input connected to out bus mid word lines for receiving a normalization value of less than one from local store 10. The rate reduces the base vertical scan height to meet the aspect ratio requirement (Character height/Scan height) of the recognition logic. An example desirable aspect ratio might be ¾ which would result in a 24 bit high character centered in a 32 bit scan field. In like manner, horizontal normalization register and DAC 936 has inputs connected to the out bus low order word lines for receiving a horizontal normalization value of less than one from lcoal store 10. The normalization value, when multiplied onto the base scan rate reduces the horizontal scan rate and increases the horizontal resolution in order to scan each character with the same number of vertical scans, for example 18 no matter how wide or narrow the character actually is on document 912. Normalization registers 934 and 936 each have a reset input which reset the registers to a "one" condition. The reset inputs are connected to the ON output of prescan flip flop 110 so that prescanning is done at unnormalized base scan rates 1 or 2.

OPERATION OF THE PREFERRED EMBODIMENT

Although the improved control system of this invention can control a character reader to perform many different operations such as reading A font characters, typed written characters, preprinted characters, hand printed characters and so forth, only the single example of reading a hand printed character will be described in detail. With the teachings of this disclosure in mind, it would be within the skill of those engaged in the art of operating character recognition machines, to write microprograms which differ from that hereinafter set forth to perform different operations by calling discrete logic control routines in different sequences with different modifying parameters.

Referring now to FIG. 10, a hand printed numeral two is disclosed on one line with a portion of another character appearing above it. It is desired to read the numeral two without interference from the portion of a character on the line above it. This operation is initiated by loading a plurality of microprograms and a plurality of normalization translating tables into local store 10 from a computer. For the purposes of this example, it will be assumed that local store 10 comprises a read/write storage having 24 bit words. This choice is primarily for ease of explanation, it being recognized that word lengths in even powers of two are more desirable in most instances. For the purposes of this example, it is further assumed that each microinstruction will comprise 12 lowest order bits for selecting the discrete logic control routine to be executed. These bits, called micro-orders, will appear on out bus lines C1 through C12. The twelve higher order bits of each microinstruction are modifier bits, for modifying the functions performed by a discrete logic control routine such as causing the routine to control scanning from left to right rather than from right to left and for modifying the discrete logic trap routine to select microinstructions out of sequence. The lower order modifier bits appearing on out bus lines M1 through M8 are connected to the discrete logic control routines while the trap routine modifier bits appearing on out bus lines MW through MZ are connected to the trap control routine shown in FIG. 2. Each entry of each normalization translate table stored in local store 10 is a 24 bit word which has been divided into three subwords of eight bits each. The lowest order subword of each table entry contains the horizontal normalization value which will appear at out bus lines C1 through C8. The middle eight bits of each table entry, which for convenience is designated as the midword, contains the vertical normalization values. The highest order eight bits of each table entry designated as the high word contains the center adjust count corresponding to the vertical normalization value stored in a corresponding midword. The midword will appear on out bus lines C9 through C12 and M1 through M4. The high word will appear on out bus lines M5 through MZ.

After the control system has been set up by loading the required microprograms and normalization translate tables, the computer will send a macroinstruction including an OP code and a CPU start signal. The OP code is decoded as shown in FIG. 2 into a microinstruction address and gated through gate AND 84, whichh was opened under control of the CPU start signal, into microinstruction counter 76. The decoded address constitutes the first address of the selected microprogram to be executed in order to perform the operation of reading the hand print numeral two, shown in FIG. 10. After the decoded address has been stored in microinstruction counter 76, it is gated out onto address bus 12 by AND gate 88 which was opened under control of the CPU start signal which set trap flip flop 50. Shortly after the first microinstruction has been addressed, it will appear at out bus 16.

The first function to be performed when reading a character will usually be to move the beam of the cathode ray tube to a point such as point A shown in FIG. 10. The location of point A on the document 912, shown in FIG. 9, with respect to he edges of document 912, would be available in the controlling computer inasmuch as the format of the document to be read must be known. The first microinstruction in this case will activate a discrete logic load accumulator control routine to load accumulator 32 with the number of vertical scan ring increments that the beam must move from the bottom of the document to reach point A. A modifier bit included in the first microinstruction would indicate to the discrete logic load accumulator control routine that the contents of the accumulator is to control a vertical move therefore the contents of the accumulator will be left shifted one bit thereby performing a multiply by two before loading the content of accumulator 32 into accumulator buffer 2. If the modifier bit of the first instruction indicated that the contents of accumulator 32 was to control a horizontal move, the contents of accumulator 32 would have been loaded into accumulator buffer 1 directly without the multiplication step. At the end of the load accumulator control routine, a routine end signal will be sent to OR gate 54 of the trap control routine shown in FIG. 2, thereby setting trap flip flop 50. Trap flip flop 50 will increment microinstruction counter 76, that number of counts called for by the modifier bits MW and MX contained within the first microinstruction. Let us assume that the first microinstruction contained a one bit on out bus line MW but zero bits on out bus lines MX, MY, and MZ. Thus, flip flop 56 would be set and microinstruction counter 76 would be incremented on instruction.

The second microinstruction in this example will provide one bits on out bus lines C4 and M1. These bits will set flop flops 410 and 420 of the move vertical control routine shown in FIG. 6. The output of flip flop 410 will open AND gate 424 to address accumulator buffer 2 in local store 10. The ON output of flip flop 420 will provide a base 2 signal to scanner 22 to cause the deflection beam to move at the faster base 2 deflection rate which is associated with larger hand printed characters. After AND gate 424 has addressed accumulator buffer 2 of local store 10, AND gate 426 causes the count from accumulator buffer 2 on the out bus to be loaded into accumulator 32 again. In addition to addressing accumulator buffer 2, the output of AND gate 424 will set latch 430 to inhibit further loading of accumulator 32. Inasmuch as the contents of accumulator 32 are positive because we are to move up to point A shown in FIG. 10, AND gate 432 will be active while AND gate 436 subtracts two counts from the count within accumulator 2 at each clock 1 time. The output of AND gate 432 causes analog gate 942 shown in FIG. 9 to open causing intergrating amplifier 924 to move the deflection cathode ray tube beam up by accumulating a positive voltage at a rate determined by base scan rate DAC 932. After the contents of accumulator 32 has been counted down to zero, AND gate 440 becomes active to set trap flip flop 50 thereby terminating the move vertical control routine. The beam is now at location A shown in FIG. 10.

The next function to be performed is to prescan the numeral two. Again microinstruction counter 76 will be incremented one count thereby addressing the third microinstruction which will place one bits on out bus lines C1, M1, and MW. These micro-orders will set modifier flip flop 56 of FIG. 2, prescan flip flop 110 and modifier flip flop 114 of FIG. 3. The discrete logic prescan control routine has thereby been activated to prescan the numeral 2 shown in FIG. 10 in order to determine its size and location in preparation for a normalized recognition scan. The output of prescan flip flop 110 activates raster AND gate 122 and scan left AND gate 126 and also resets normalization registers 934 and 936 of FIG. 9 to an all one condition so that the prescan is performed at the base 2 rate and is uneffected by normalization values from previous routines. The output of raster AND gate 122 activates vertical scan generator 922 also shown in FIG. 9 while the output of scan left gate 126 activates analog gate 952 and integrating amplifier 928 to provide horizontal movement between vertical scans 510, 512, 514, 516, and so forth shown in FIG. 10. During the first scan 510, sequencing gates 128, 130, 140, and 134 will reset the contents of accumulator buffer 1 to zero. During prescan 516, scanner 22 encounters adequate dark spaces on document 912 to allow data filter 24 to detect a minimum character requirement MCR. Referring now to FIG. 3, the MCR signal from data filter 24 opens sequencing gates 132 and 136 while closing sequencing gate 140 to allow a count of the width of the numeral 2 shown in FIG. 10, in terms of a number of prescans, (nine in this example) to be accumulated in accumulator buffer 1. At the end of each prescan, AND gate 136 causes the video data from that prescan which has been sequentially stored in auxiliary register 710, shown in FIG. 7, to be transferred in parallel to profile register 720. Stages of profile register 720 are thus set whenever dark bits appear but are never reset in this operation, therefore, all prescans appear superimposed and result in a profile of the character. During each prescan, profile register 720 is recirculated and logic gates 812 and 814 of compute logic 34 shown in FIG. 8, generate a count in accumulator 32 which is one or more if the character profile is high in profile register 720 and which is negative if the profile is low. If the profile is high, character high latch 824 is set whereas if the character is low, character low latch 826 is set. If the accumulator contains a zero neither latch 824 or 826 will be set. The information stored in these latches will be used later when calculating the prescanned character height and the amount of adjustment needed in the scan staring position in order to have an accurately centered recognition scan. A diagram of the profile being built up in profile register is shown at the left of FIG. 10. During prescan 534, no dark areas are encountered on document 912 and data filter 24 generates a segment signal indicating that the end of the character has been detected. The segment signal resets latch 810 to inhibit further character position determination by compute logic 34 and also opens AND gate 140 to generate a prescan end signal which sets trap flip flop 50 thereby terinating the prescan control routine. Integrating amplifier 928 is now holding the cathode ray tube beam at position B shown in FIG. 10.

The next functions that must be performed are to determine the rate and starting position of the recognition scans. These functions are performed by the compute control routine which is activated by the fourth micro-instruction which places a one bit on out bus lines C2, M1, and MW. These micro-orders will set compute flip flop 210, modifier flip flop 220, and modifier flip flop 56. The ON output of compute flip flop 210 acts through AND gate 226 to set compute normalized width latch 228. Latch 228 is set at VSR 37 time and reset at VSR 40 time. The ON output of latch 228 will open AND gate 230 to address accumulator buffer 1 in local store 10. The contents (in this case a count of nine) of accumulator buffer 1 are then transferred from OUT bus 16 into accumulator 32 by AND gate 234. A first higher order bit of accumulator 32 is forced to a one condition by the output of AND gate 238 which is conditioned by the ON output of modifier flip flop 220. This causes accumulator 32 to generate the address of the hand print normalization translate table in local store 10. Let us assume for purposes of this example that recognition logic 26 requires that hand print characters be normalized to 18 scans wide and 24 bits high with an aspect ratio of ¾. The vertical aspect ratio is the ratio of the height of the character to the height of each scan. It will be understood that other widths, heights, and aspect ratios could have been chosen for use with this invention. After the address of the hand print normalization translate table has been generated, AND gate 232 transfers the address to address bus 12. In this example, since a horizontal normalization factor of 2 is required, the count of nine, with the higher order one bit on address bus 12 will address a hand print normalization table entry having a value of 0.5 in the low word position. This value of 0.5 is transferred to scanner horizontal normalization register and DAC 932 of scanner 22 to reduce the horizontal scanning rate to ½ of the prescan rate thereby doubling the number of scans to 18 scans. To assist in a further understanding of the normalization translate table, if a count of 6 had been placed on address bus 12, the low word of the addressed normalization table entry would have contained a value of 0.3333 in order to triple the number of scans thereby equalling 18 scans. In like manner, if a count of 15 had been placed on address bus 12, the low word of the address normalization table entry would have contained a value of 0.833 to be stored in normalization register 936 causing multiplier 56 to reduce the horizontal scanning rate by approximately 83 percent and thereby increasing the number of vertical scans from 15 to 18. After horizontal normalization register 936 has been loaded, compute normalized width latch 228 is reset at VSR 40 time and compute normalized height latch 262 is set at VSR 1 time. Accumulator 32 is also reset to zero at VSR 40 time by AND gate 272. As previously explained, the probability is high that the character to be recognized is closer to the center line of the prescanned area than another vertically adjacent character. This probability is used to prevent voids from being recognized as the top or bottom of a character. The voids in a character profile are rejected by setting upper add latch 828 and lower add latch 830 to compute logic 34 shown in FIG. 8 at the same time that compute normalized height latch 252 is set, but preventing latches 828 and 830 from being reset until eight VSR times later. Reset is inhibited by latch 846 which controls reset AND gates 842 and 844. In the example of FIG.. 10, there is more dark space below the center line than there is above the center line, therefore character low latch 826 was set during the prescan routines. Thus, only AND gates 834 and 836 can be enabled by outputs from profile register R16 or R17 of profile register 720. Referring now to FIG. 7, it can be seen that profile register 720 will be circulated in tow loops from stages R16 to R1 and stages R17 to R32 when shift pulses are present at AND gate 730 output. Gate 730 generates shift pulses from VSR 1 through VSR 16 of each compute control routine because latch 734 and OR gate 728 are conditioned during this interval of time. Referring again to FIG. 10, where a diagram of the contents of profile register 720 is shown, it can be seen that at VSR 1 time, stages R16 and R17 contain zeros therefore no count will be added to accumulator 32 at VSR 1 time. At VSR 2 time, profile register 720 will be circulated causing a one bit to move up into stage R16 and a zero bit to move down into stage R17. AND gate 834 will thus be opened which through OR gate 816 will add a count of one to accumulator 32. In like manner, a count of one will be added at VSR 3 time and VSR 4 time. This operation is continued until VSR 14 time when stages R15 and R16 of profile register 720 will contain the zeros originally stored stages R2 and R3. These zeros will reset lower add latch 830 by activating AND gate 844 thereby terminating the height count accumulation with a count of 12 in accumulator 32. At VSR 17 time, profile register 720 has been shifted 16 times, all bits have been presented to compute logic 34 and a count of the height of the character in profile register 720 has been accumulated in accumulator 32. At VSR 18 time, AND gate 250 enables AND gate 238 for a second time to force a higher order stage of accumulator 32 to an ON condition thereby causing the hand print normalization table to be addressed by the count in accumulator 32 rather than one of the other tables such as those relating to typewritten or preprinted character normalization. AND gate 258 then places the generated address on address bus 12 and also gates the vertical normalization value stored in the midword of the address table entry into normalization register 934. AND gate 260 gates the output high word containing the normalization center adjustment into accumulator 32. In the example of FIG. 10, the numeral two was found to be twelve counts high. As previously described, we have assumed an aspect ratio of ¾ and a normalized character height of 24 bits for purposes of this example. Thus, the recognition scan will be normalized if it is accomplished at ½ of the prescan rate. Thus, the vertical normalization taken from the address table entry and stored in register 934 will have a value of 0.5 allowing multiplier 930 to reduce the vertical height by ½ thereby doubling the apparent character size.

After normalizig the height of the vertical scan, the starting point must be adjusted so that the recognition scan raster is centered on the character. This adjustment is accomplished in two steps. A first step called "normalization center adjust" raises the starting point of the reduced height recognition scan so that it is centered in the area which was prescanned. In the example of FIG. 10, the recognition raster size is reduced by one half, therefore the starting point must be moved up one fourth of a prescan to divide the nonscanned area between the top and bottom. The example of FIG. 10 therefore must be moved up eight counts. The normalization center adjust values can be expressed in equation form as follows:

normalization adjustment = (Prescan height-normalized scan height)/2. The division by two is accomplished when the vertical adjustment is used in move vertical control routine shown in FIG. 6 by counting down by counts of two instead of counts by one. Thus, the high word of each entry of the normalization table has a value of 32-midword value × 32. The constant 32, of course, comes from the fact that there are 32 sample times in each vertical scan. For the example of FIG. 10 therefore, the high word value corresponding to the midword value of 0.5 will be 32 − 16 = 16. The count of 16 will be stored in accumulator 32 by AND gate 260. The next step in adjusting the vertical starting position is to compensate for the fact that the prescan was not centered on the numeral tow to be recognized. This additional adjustment is called "prescan center adjustment." The character profile stored in profile register 720 is used to generate the prescan center adjustment count which is counted into accumulator 32 on top of the normalization center adjust count of 16 which already has been stored in accumulator 32. When as in FIG. 10, the profile of the character is completely below the center line of the prescanned area, AND gate 850 will set latch 854. AND gate 850 was activated by the fact that there were four zero bits in stages R17, R18, R19, and R0, character low latch 826 was set during the prescan control routine, and compute center adjust latch 262 was set at VSR 20 time. The output of double subtract latch 854 will cause two counts to be subtracted from accumulator 32 during each VSR time. Double subtract latch 854 will be reset at VSR 21 time because AND gate 730 of FIG. 7 has been opened by latch 826 to recirculate profile register 720 thereby bringing the 1 bit originally stored in stages R14 and R15 into R15 and R16 respectively to open AND gate 974 which resets latch 854. At this time, however, AND gate 872 will be opened activating AND gate 884 causing OR gate 818 to subtract a count of one. This operation will continue for each VSR time interval until VSR 28 time when seek bottom latch 892 will be set allowing OR gate 818 to continue subtracting counts of one at each VSR time. Seek bottom latch 892 is reset when the two zero bits originally stored in stages R2 and R3 have been shifted up to stages R15 and R16. Accumulator 32 now contains a count of two. The original count of 16 less the count of 2 subtracted while the profile was shifted up to the center of the profile register and less the 12 counts, subtracted 1 count at a time while the profile was recirculated until the bottom of the character is at the center of profile register 720 leaves a count of 2. The count of 2 now in accumulator 32 is transferred to accumulator buffer 32 by AND gate 268 of FIG. 4 which encodes accumulator buffer 2 to address and AND gate 266 which transfers the count of 2 from accumulator 32 to in bus 14 for storage in accumulator buffer 2 of local store 10. All normalization and center adjust computations have now been completed and AND gate 270 generated a compute end signal which again sets trap latch 50 to retrieve the next microinstruction.

As described earlier, the beam of cathode ray tube 914 is positioned at point B of FIG. 10 after the prescan control routine has been completed and has stored a count of nine in accumulator buffer. The compute control routine has also been completed and has stored a vertical adjustment count in accumulator buffer 2. The next function that must be performed is to move the beam of cathode ray tube back to point C. This function is performed by move horizontal control routine shown in FIG. 5 which is activated by the fifth microinstruction which places one bits onout bus lines C3, M1, M2, and MW. These micro-orders set flip flops 310, 320, and 322 of FIG. 3 as well as flip flop 56 of FIG. 2. The output of flip flop 310 opens AND gate 324 to address accumulator buffer 1 in local store 10. AND gate 326 transfer the count of nine, previously stored in accumulator buffer 1 by the prescan control routine, to accumulator 32. The output of AND gate 324 then sets latch 330 to prevent further loading of accumulator 32. The output of flip flop 320 activates base 2 line to scanner 22 causing the beam to move at the base 2 deflection rate. The output of flip flop 322 with the output latch 330 enables AND gate 328 which sends a move rights signal to scanner 22. The move right signal opens analog gate 950, activating inverter 944 which provides a negative signal to integrating amplifier 928, all shown in FIG. 9, to cause horizontal deflection to the right. At clock 1 time of VSR times 40, 8, 16, 24, and 32 AND gate 332 subtracts a count of 1 from accumulator 32. Thus, each count stored in accumulator 32 which corresponds to a horizontal deflection to the left for eight VSR times during each prescan is substracted for each eight VSR times while the beam is moving right. When the contents of accumulator 32 equals zero, AND gate 334 will be opened to set trap flip flop 50 and terminate horizontal motion when the beam has been positioned at point C shown in FIG. 10.

The next function that must be performed is to raise the starting position of the beam by the amount of center adjustment count stored in accumulator buffer 2. This function is performed by the move vertical control routine which is activated by the sixth microinstruction which places a one bit on out bus lines C4, M1, and MW. The sixth microinstruction will be noted to be the same as the second macroinstruction and activate the same vertical control routine, however the vertical distance to be moved which is stored in accumulator buffer 2 is different this time. The overall operation is the same however. The contents of accumulator buffer 2 is retrieved from local store 10 by AND gates 424 and 426. Latch 430 is set opening AND gate 432 which causes scanner 22 to move the beam up while AND gate 436 substracts a count of 2 from the count in accumulator 32. After the first count of 2 has been subtracted, the contents of accumulator 32 equals zero, therefore AND gate 440 is active to terminat this routine by setting trap flip flop 50. The beam of cathode ray tube 914 is now positioned at point B of FIG. 16 which is the correct starting point for a properly normalized recognition scans 540, 542 and so forth, of the numeral two of FIG. 10.

The next function to be performed will be a recognition scan activated by the seventh microinstruction. This discrete logic recognition scan control routine would be similar in operation to that of the prescan control routine. It is also apparent that additional functions can be implemented in discrete logic control routines following the teachings set forth in this specification to implement any machine control function and thereby derive the advantages of high operating speed while simultaneously controlling vast numbers of sequencing gates without the need for a large and fast memory for storing long microinstructions.

While the invention has been particularly shown and described with reference to a preferred embodiment, it will be understood by those skilled in the art that the foregoing and other changes in form and detail may be made therein without departing from the spirit and scope of the invention

What is claimed is:

1. A control system using microprogram selection of discrete logic control routines for a character reader, comprising:

a local store for storing microprograms, tables, and intermediate computation results;

a sequence control unit connected to said local store for receiving microinstructions therefrom, said sequence control containing discrete logic control routines including a discrete logic trap control routine comprising decoder means for decoding an instruction received from a computer to provide a microprogram start address, and comprising microinstruction addressing means connected to said decoder means and to said local store for receiving said start address and for addressing storage locations within said local store, and further comprising incrementing logic having inputs connected to outputs from said discrete logic control routines and to outputs of said local store for incrementing an address within said microinstruction addressing means;

an arithmetic logic unit connected to said local store and to said sequence control unit for performing computations under the control of said sequence control unit, said arithmetic logic unit further comprising a profile generator for accumulating a vertical profile of a character thereby indicating the height and vertical position of said character, and an accumulator for counting under control of said discrete logic control routines; and a controlled character reader connected to said sequence control unit and receiving direct control therefrom, connected to said local store and receiving operating parameter information therefrom, and connected to said arithmetic logic unit for providing feedback information thereto.

2. A control system as in claim 1 wherein said sequence control includes discrete prescan control logic comprising:

prescan micro-order storage means for storing a prescan micro-order;

prescan modifier micro-order storage means for storing base scan rate and direction micro-orders, the outputs of said prescan modifier micro-order storage means being connected to said character reader to provide raster size and scan direction control;

a plurality of sequencing gates each having a first input connected to said prescan micro-order storage means, a second input connected to said character reader, a third input connected to said system timing, and an output connected to said arithmetic logic unit, a first of said sequencing gates controlling said profile generator to accumulate said vertical profile, and others of said sequencing gates controlling said accumulator for generating a prescan width count of a character.

3. A control system as in claim 2 wherein said sequence control includes discrete compute control logic comprising:

compute micro-order storage means for storing a compute micro-order;

compute modifier micro-order storage means for storing character type micro-orders, the outputs of said compute modifier micro-order storage means being connected to said arithmetic logic unit through logic gates for modifying table addresses being generated in said arithmetic logic unit thereby generating different table addresses for different character types having the same size;

normalize width latch having set inputs connected to said compute storage means and to said system timing, the output of said normalize width latch operating through logic gates sequenced by said system timing to address a table entry in said local store, utilizing said prescan width count as an incremental address and output from said compute modifier storage means as a base address, and to transfer a horizontal scan rate stored at said addressed table entry to said character reader;

normalize height latch having set inputs connected to said compute storage means and to said system timing, the output of said normalize height latch operating through logic gates sequenced by said system timing to address a table entry in said local store, utilizing a prescan profile height count as an incremental address and output from said compute modifier storage means as a base address, and to transfer the vertical scan rate and the normalization center adjustment stored at said addressed table entry to said character reader and to said arithmetic logic unit respectively;

center adjust latch having set input connected to said compute storage means and to said system timging, the output of said center adjust latch operating through logic gates sequenced by said system timing to add a prescan center adjustment to said normalization center adjustment for adjusting the vertical position of the normalized vertical scans by a move distance to coincide with the location of a character;

sequencing gates for storing said move distance in said memory;

4. A control system as in claim 3 wherein said sequence control includes move horizontal control logic comprising:

move horizontal micro-order storage means for storing a move horizontal micro-order;

horizontal modifier micro-order storage means for storing move rate and direction micro-orders, the output of said horizontal modifier micro-order storage means being connected to said character reader to provide rate of position change and direction control;

move distance retrieval gates connected to the output of said move horizontal micro-order storage means for retrieving a move distance from memory and loading it into said accumulators;

sequencing gates each having a first input controlled by said move horizontal micro-order storage means and a second input connected to said system timing for sequentially incrementing said accumulator whenever predetermined intervals of time have passed.

5. A control as in claim 3 wherein said sequence control includes move vertical control logic comprising:

move vertical micro-order storage means for storing a move vertical micro-order;

vertical modifier micro-order storage means for storing move rate and direction micro-orders, the output of said horizontal modifier micro-order storage means being connected to said character reader to provide rate of position change and direction control;

move distance retrieval gates connected to the output of said move vertical micro-order storage means for retrieving a move distance from memory and loading it into said accumulator;

sequencing gates each having a first input controlled by said move vertical micro-order storage means and a second input connected to said system timing for sequentially incrementing said accumulator whenever a predetermined interval of time has passed.

6. The control system of claim 1 wherein said profile generator further comprises:

a center directed profile shift register;

recirculation gates having inputs connected to outputs of center most stages of said profile register and having outputs connected to inputs of end stages of said profile register;

a shift input, receiving a shift signal for recirculating data within said profile register in two circular paths from each end toward the center of said profile register.

7. The control system of claim 6 wherein said profile generator further comprises:

an auxiliary register having an input for receiving data from said character reader representing a scan of a character;

gating means having inputs connected to outputs of each stage of said auxiliary register, and having outputs connected to set inputs of corresponding stages of said profile register for accumulating a profile of said character by superimposing data from each scan of said character in said profile register.

8. The control system of claim 6 wherein said arithmetic unit includes compute logic having inputs connected to said profile register and outputs connected to said accumulator.

9. The control system of claim 8 wherein said compute logic further comprises:

character height compute logic controlled by said height latch of said discrete compute control logic for counting the number of dark bits within said vertical profile of a first character located closest to the center of said profile register and rejecting dark bits from adjacent characters, said adjacent characters being located farther from said center line than said first character, said number of dark bits being said prescan profile height count, and;

center adjust compute logic controlled by said center adjust latch of said discrete compute control logic for counting the number of bit positions from the center of said vertical profile of said first character to the center of said profile register;

thereby generating said prescan center adjustment, said prescan center adjustment being counted into said accumulator on top of said normalization center adjustment thereby adding said prescan center adjustment to said normalization center adjustment to provide said move distance.

* * * * *